(12) United States Patent
Bragg

(10) Patent No.: US 12,486,942 B2
(45) Date of Patent: Dec. 2, 2025

(54) CLAMP FOR TUBING AND THE LIKE

(71) Applicant: DOCKBLOXX, LLC, Gainesville, GA (US)

(72) Inventor: Brady Bragg, Hoschton, GA (US)

(73) Assignee: DOCKBLOXX, LLC, Gainesville, GA (US)

( * ) Notice: Subject to any disclaimer, the term of this patent is extended or adjusted under 35 U.S.C. 154(b) by 0 days.

(21) Appl. No.: 18/643,151

(22) Filed: Apr. 23, 2024

(65) Prior Publication Data

US 2024/0271746 A1 Aug. 15, 2024

Related U.S. Application Data

(63) Continuation-in-part of application No. 18/207,922, filed on Jun. 9, 2023, now Pat. No. 11,994,254, which is a continuation-in-part of application No. 29/841,910, filed on Jun. 9, 2022.

(51) Int. Cl.
*F16M 13/02* (2006.01)
*F16B 2/12* (2006.01)

(52) U.S. Cl.
CPC .............. *F16M 13/02* (2013.01); *F16B 2/12* (2013.01)

(58) Field of Classification Search
CPC ......... F16M 13/02; F16L 3/222; F24S 30/425

USPC ........................................................ 248/218.4
See application file for complete search history.

(56) References Cited

U.S. PATENT DOCUMENTS

| 2,636,527 | A | 4/1953 | Schubel et al. |
| 2,914,279 | A | 11/1959 | Bales |
| 3,575,243 | A | 4/1971 | Mark et al. |
| 4,050,524 | A | 9/1977 | Hake |
| 4,941,690 | A | 7/1990 | Bodine, Sr. |
| 9,033,289 | B2 * | 5/2015 | Hennon .................. F16L 3/222 248/65 |
| 9,609,798 | B2 * | 4/2017 | Sandberg ................ F16F 1/545 |
| 10,109,932 | B2 * | 10/2018 | Trombley .............. H01R 4/643 |
| 10,972,045 | B2 * | 4/2021 | Cherukupalli ........ F24S 30/425 |
| 11,994,254 | B2 * | 5/2024 | Bragg ..................... F16B 2/065 |

* cited by examiner

*Primary Examiner* — Todd M Epps
(74) *Attorney, Agent, or Firm* — Perilla Knox & Hildebrandt LLP; Stephanie Davy-Jow

(57) ABSTRACT

A clamp for removable attachment to tubing or the like including two components oriented relative to each other for removable engagement therebetween. The clamp may include one or more fasteners to provide for secure and removable attachment of the two components together, and for securing itself to the tubing or the like. In example embodiments, the two components may be substantially identical to each other, and reorienting them relative to each other permits removable engagement therebetween. One or more components or supports may be permitted for engagement with one or more clamps for supporting or temporarily securing items or other desired devices thereto.

20 Claims, 16 Drawing Sheets

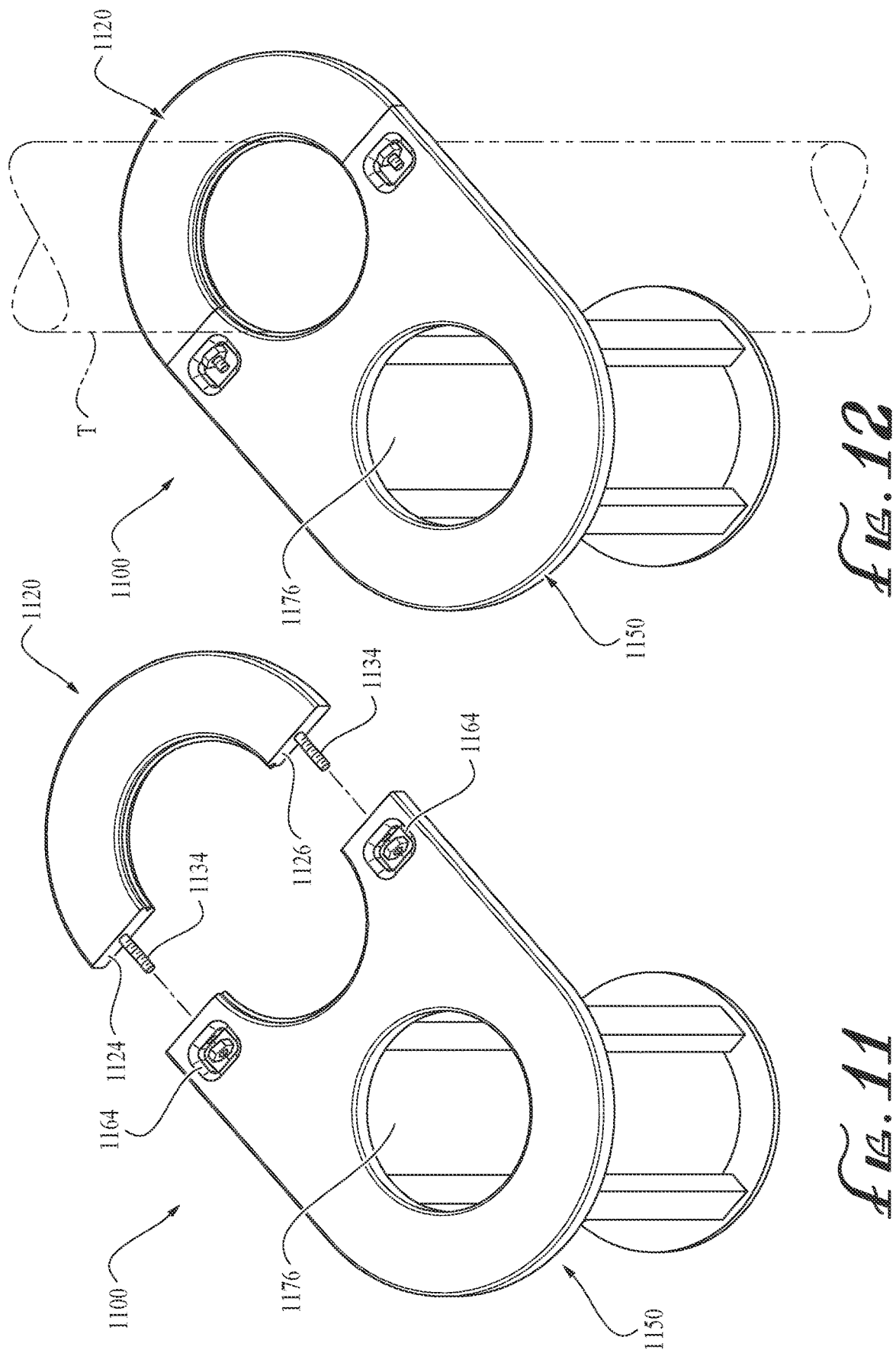

CLAMP FOR TUBING AND THE LIKE

CROSS-REFERENCE TO RELATED APPLICATION

This application is a continuation-in-part of U.S. Nonprovisional patent application Ser. No. 18/207,922 filed Jun. 9, 2023, which is a continuation-in-part of U.S. Design patent application Ser. No. 29/841,910 filed Jun. 9, 2022, the entirety of each of which is hereby incorporated herein by reference.

TECHNICAL FIELD

The present invention relates generally to the field of tubing and the like, and more particularly to a bracket assembly or clamp and to its mounting capabilities thereof for tubing and the like.

BACKGROUND

Typically, some environments lend themselves to structures where one or more structural components are incorporated with the structure to provide for support thereof, for example, such as square tubing commonly utilized in residential and commercial marina docking systems, or for example one or more supports affixed within a structure's interior, most commonly comprising a square or circular cross-section to provide support to the structure's components bearing a load thereon. In some cases, altering the tubing is prohibited and thus remains bare and unused, simply acting as a support for the structure. In other cases, one or more supports (especially in interior environments) may comprise one or more components or objects attached thereto (e.g., an AED, emergency phone, thermostat interface, fire alarm, fire extinguisher, etc.) but is otherwise unutilized as a substantial amount of available space may remain above anything attached thereto.

In most cases, regardless of the problem, the usable walking area becomes filled with one or more relevant items, tools or accessories. For example, in the marine docking area, items most commonly scattered along the dock/walking surface could be a water hose, life jackets, fishing poles, floats and towable floats, towels or other items one may need while boating, which pose an extremely dangerous tripping hazard to anyone walking on the dock which could result in serious injury or death. And in other environments, for example such as warehouses and other commercial structures, one or more components or hardware may find themselves occupying space at the ground floor, reducing the amount of available space an occupant of the structure may theoretically utilize due to obstructions.

Accordingly, it can be seen that needs exist for a clamp for tubing and the like. It is to the provision of a clamp for tubing and the like meeting these and other needs that the present invention is primarily directed.

SUMMARY

In example embodiments, the present invention provides a mounting assembly, also referred to as a clamp. The mounting assembly can be removably attached to a support structure, also referred to as a tubing member, can be such as tubing, posts, poles, beams, and the like. The clamp includes two brackets or components removably engaged with each other and frictionally engaging with a support structure fitted therebetween. One or more attachment components can be removably engaged with one or both of the components so as to provide one or more attachment or mounting portions as desired. One or more cutouts and/or openings can be provided for facilitating removable engagement with the attachment components, or for example one or more straps, or various accessories can be removably or permanently connected thereto to serve various functions. The mounting assembly can be modified according to need, such that it can be used to hold tools or accessories.

Advantageously, the mounting assembly is adaptable to be fitted to support structures of almost any size or shape, whether structural or decorative. Each of the two clamps include a clamping surface that engages with the support structure when the two clamps are fastened together. The clamping surfaces form an aperture that has a complimentary shape to the support structure. The mounting assembly is adaptable at manufacture and can be formed to accommodate standard shapes and diameters of support structures. The mounting assembly can also be customized to fit non-standard sizes and shapes of support structures. For example, in one example embodiment, the mounting assembly can be manufactured for attachment to a cylindrical support structure, such that the internal aperture of the mounting assembly is circular to frictionally engage with the cylindrical support structure. In various aspects, the cylindrical support structure can have a diameter of e.g. 2 inches, 5.5 inches, 3 inches, or 4 inches. In another example embodiment, the tubing member has a generally square outer profile defining four sides of a similar dimension. The clamp having a first bracket portion and a second bracket portion, the first and second bracket portions each having a clamping portion and a coupling portion, wherein the clamping portion of each bracket portion is configured for engagement with at least one of the four sides of the tubing member, and wherein the coupling portion of each bracket permits removable coupling engagement therebetween so as to permit frictional engagement of the clamping portions with the tube. As can be envisioned by a person having ordinary skill in the art, other support structure shapes (e.g. octagonal, ovoid, rectangular) having various dimensions can be accommodated by modifying the shape of the clamping surfaces.

The mounting assembly allows for customized accessory storage in a range of locations. The mounting assembly can be installed on vertical or horizontal support structures and can be used in virtually any location that includes a beam, pole, or post. Non-limiting examples include dock tubing, garages, barns, fence posts, lampposts, sports courts, patios, pool decks, warehouses, retail displays, or other locations where storage and organization are useful.

Advantageously, the mounting assembly is a customizable solution for various storage needs without the need for modifying the support structure. While strongly attached to the support structure, the mounting assembly is removably affixed and does not damage the support structure. The mounting assembly comprises a clamping portion that maintains contact with the support structure through friction. Depending on need, more than one mounting assembly can be affixed to a support structure to create multiple levels on which accessories can be mounted. In other embodiments, the brackets and clamping portion can be modular to fit to a specific support structure size and shape; the outer portions of the mounting assembly can then be attached to customize the basic mounting assembly. For example, a user can purchase a basic clamping portion for a specific support size, then add external mounting portions based on need. The external mounting portions can be affixed to the basic clamping portion using bolts, clamps, snap fitted parts, or other fasteners as can be envisioned by a person having ordinary skill in the art.

In example embodiments, at least one of the first and second bracket portions includes an attachment portion, the attachment portion having at least one cutout and/or opening. In example embodiments, the attachment portion has a cutout formed with the clamping portion of one of the bracket portions, and wherein an attachment component is configured for removable coupling engagement with the cutout, the attachment component forming at least a portion of the clamping portion of its respective bracket portion when removably connected with the cutout. In example embodiments, the attachment component has a coupling portion and a mounting portion, the coupling portion having a keyed cutout, the keyed cutout having a central neck, an upper engagement lip and a lower base engagement surface, the mounting portion having an attachment surface. In example embodiments, the attachment surface of the mounting portion is configured for the attachment of an accessory mount and/or items thereto. In example embodiments, the first and second bracket portions are formed from a sheet material having a thickness of at least 0.25 inches. In example embodiments, the sheet material is a high-density polyethylene. In example embodiments, the coupling portion of each bracket portion has a male end and a female end, the male end having a threaded fastener and the female end having a receiver for receiving the threaded fastener and a passageway for securing a threaded nut to the threaded fastener, wherein the clamping portion of each bracket portion is positioned between the male and female ends of its respective coupling portion. In another aspect, the fasteners can be located in a countersunk pocket so that the top surface of the bracket is solid.

In example embodiments, at least the coupling portions of the first and second bracket portions are substantially similar so as to permit for removable coupling engagement with the tube therebetween. In example embodiments, at least the clamping and coupling portions of the first and second bracket portions are sized and shaped to be compatible for removably connecting with each other while frictionally engaging the tube therebetween. In example embodiments, the clamping and coupling portion of each bracket portion form an L-shaped configuration wherein first and second transversely oriented sides of the clamping portion diverge outwardly a length and terminate at respective coupling faces of the coupling portion. In example embodiments, the coupling faces are angled at about 45 degrees relative to the side of the clamping portion nearest thereto. In example embodiments, the direction of the clamping force provided by the coupling portions to the clamping portions is angled relative to the sides of the tube it is frictionally engaging.

In example embodiments, the clamping and coupling portion of each bracket are sized and shaped to be compatible for removably connecting with each other while frictionally engaging the support structure therebetween, such that the clamping portion of each bracket comprises a coupling surface configured for engagement with a half of a perimeter of the support structure such that in a coupled position the clamping surfaces of the brackets are complimentary to an outer profile of the support structure. In other words, when clamped together, the clamping surfaces of the mounting assembly form an inner aperture having the same shape as the perimeter or circumference of the support structure. In an embodiment, the support structure can be a cylindrical pole and the inner aperture of the assembled mounting assembly forms a circle dimensioned to frictionally engage the cylindrical pole. In another embodiment, the support structure can be square or rectangular and the inner aperture of the assembled mounting assembly forms a complementary square or rectangle dimensioned to frictionally engage the support structure. In another embodiment, the support structure can be octagonal and the inner aperture of the assembled mounting assembly forms a complementary octagon dimensioned to frictionally engage the support structure. As can be envisioned by a person having ordinary skill in the art, the internal aperture formed by the clamping surfaces can be shaped to receive support structures of varying sizes and shapes.

Advantageously, the brackets can be customized in various shapes and sizes according to a user's need, where the inner aperture accommodates the support structure. For example, one bracket can have an L-shaped outer edge while the other is rounded, or both can be identical. In other examples, the brackets can have cupholder apertures, hooks, reliefs, small holes for accessories such as towels, hooks, or carabiners. Two brackets can be identical or different in a given mounting assembly, provided their coupling portions and clamping portions match. In some embodiments, the two brackets are duplicated. The outer dimensions of the brackets can vary from small to large according need. In embodiments having a large external diameter or perimeter, additional coupled fasteners can be added to provide strength.

In example embodiments, the brackets can be fastened together using male and female threaded fasteners such as a stud or bolt, as described above. In other embodiments, the brackets can be fastened together using latches, ratches, zip ties, or other fasteners that can be tightened, as can be envisioned by a person having ordinary skill in the art.

In example embodiments, the outer edge of the brackets can include a groove to receive a such as a band clamp, where the clamp can be tightened to frictionally engage the mounting assembly to the support structure. Such an outer fastener can provide additional space on the mounting surface for additional cutouts or accessory mounts in place of the threaded fasteners.

In another aspect, the present invention relates to a bracket component of a mounting assembly having a first arm and a second arm, the first and second arms having a length defined between their respective ends, a width and a thickness. The first and second arms are generally oriented transverse relative thereto wherein ends thereof are connected together and outwardly extend therefrom, the bracket component having an upper surface, a lower surface generally opposite thereto, and a peripheral surface defined therebetween.

In example embodiments, a pair of the bracket components may be removably connected together to form the mounting assembly, each bracket component having at least one clamping surface configured for frictional engagement with an outer surface of a support. In example embodiments, the bracket component further includes a clamping portion and a coupling portion, the clamping portion being defined by a portion of the peripheral surface of the bracket component and the coupling portion being defined at one or both ends of the arms. In example embodiments, the bracket component further includes a mounting portion including a cutout or opening extending between the upper and lower surfaces thereof, the cutout or opening permitting removable attachment of an attachment component or accessory mounts or items.

In example embodiments, the length is at least about 3.5 inches, the width is at least about 0.5 inches, and the thickness is at least about 0.25 inches. In example embodiments, the bracket component is formed from a plastic or polymer material. In example embodiments, an outermost end of the first arm has a male coupling element and an outermost end of the second arm has a female coupling element. In example embodiments, the male coupling element has a threaded fastener and the female coupling element has a receiver and passageway. In example embodiments, further including a second bracket component, the second bracket component being substantially identical to the bracket component such that the male coupling element removably engageable with a female coupling element of the second bracket component and the female coupling element of the bracket component is removably engageable with a male coupling element of the second bracket component.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 11 and FIG. 12 show another embodiment of a mounting assembly in accordance with the present disclosure, having a first bracket including two female coupling elements configured to receive two male coupling elements from a second bracket.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
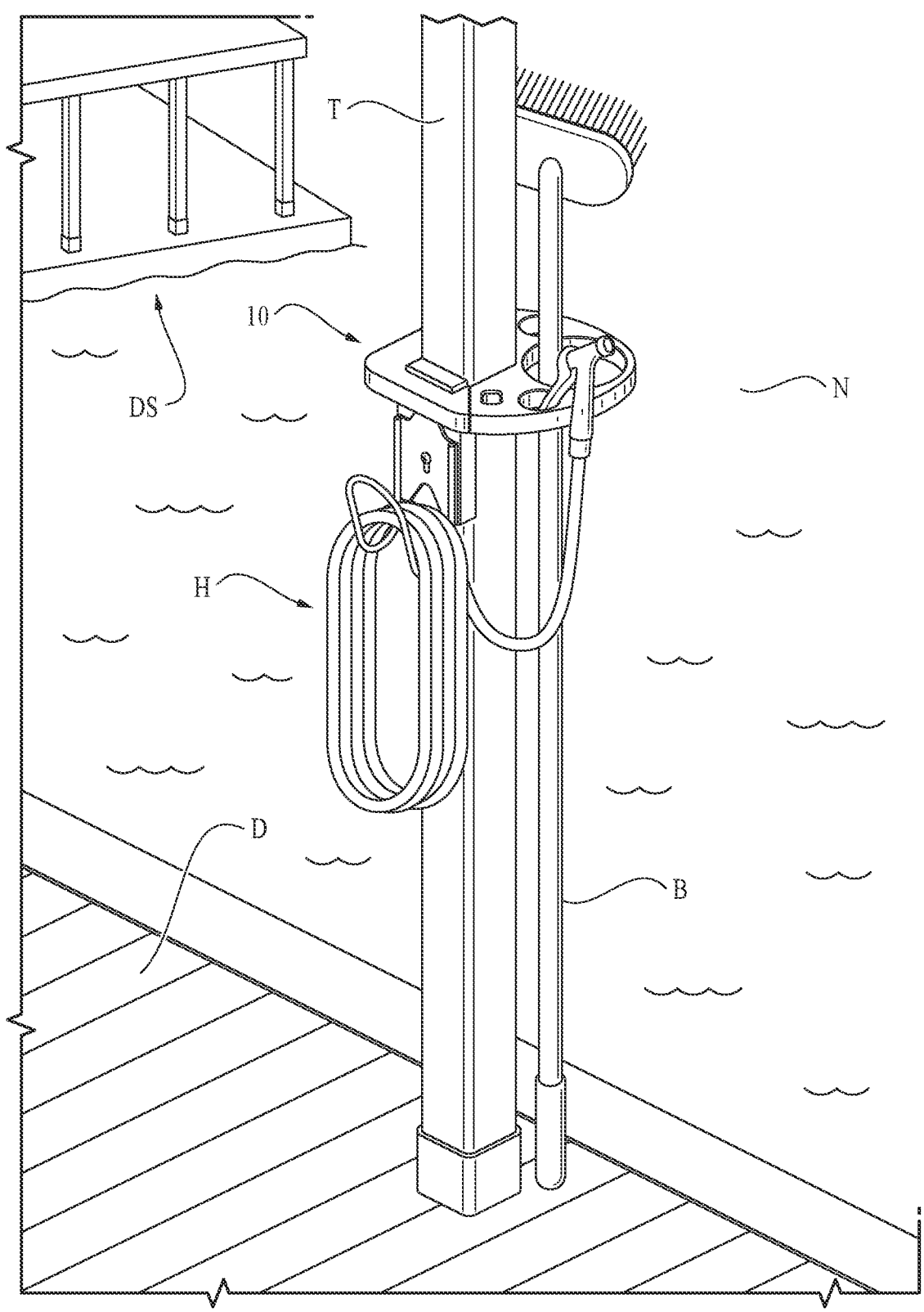
FIG. 1 shows a clamp removably secured to a vertical tubing component according to an example embodiment of the present invention, showing the clamp being configured for the removable attachment of a wound water hose, nozzle, and separate scrub brush with long attachment handle.

With reference now to the drawing figures, wherein like reference numbers represent corresponding parts throughout the several views, FIG. 1 shows an example embodiment of a clamp, mounting assembly or bracket assembly 10 removably connected to a support or tube T of marine docking structure DS. Commonly among marine docking structures DS, one or more supports or tubes T extend vertically from or below a walking surface or deck D to an overhead structure where a roof covering is attached. As shown, the bracket assembly 10 is connected to the tube T a distance above the deck D and is retaining a wound water hose, connected nozzle, and brush assembly B. As will be described in greater detail below, the bracket assembly 10 is preferably frictionally engaged with one or more sides of the tube so as to withstand any downward, upward and/or outward forces (and/or combinations thereof) that may be applied thereto during the various uses and functionalities thereof, thereby remaining engaged yet permitting for the removability thereof as desired. Furthermore, according to example embodiments, the bracket assembly 10 may be non-invasive such that its removable attachment to the tube T, use while removably attached to the tube T, and detachment from the tube T causes no altering or damage to the tube T.

Figure 2:
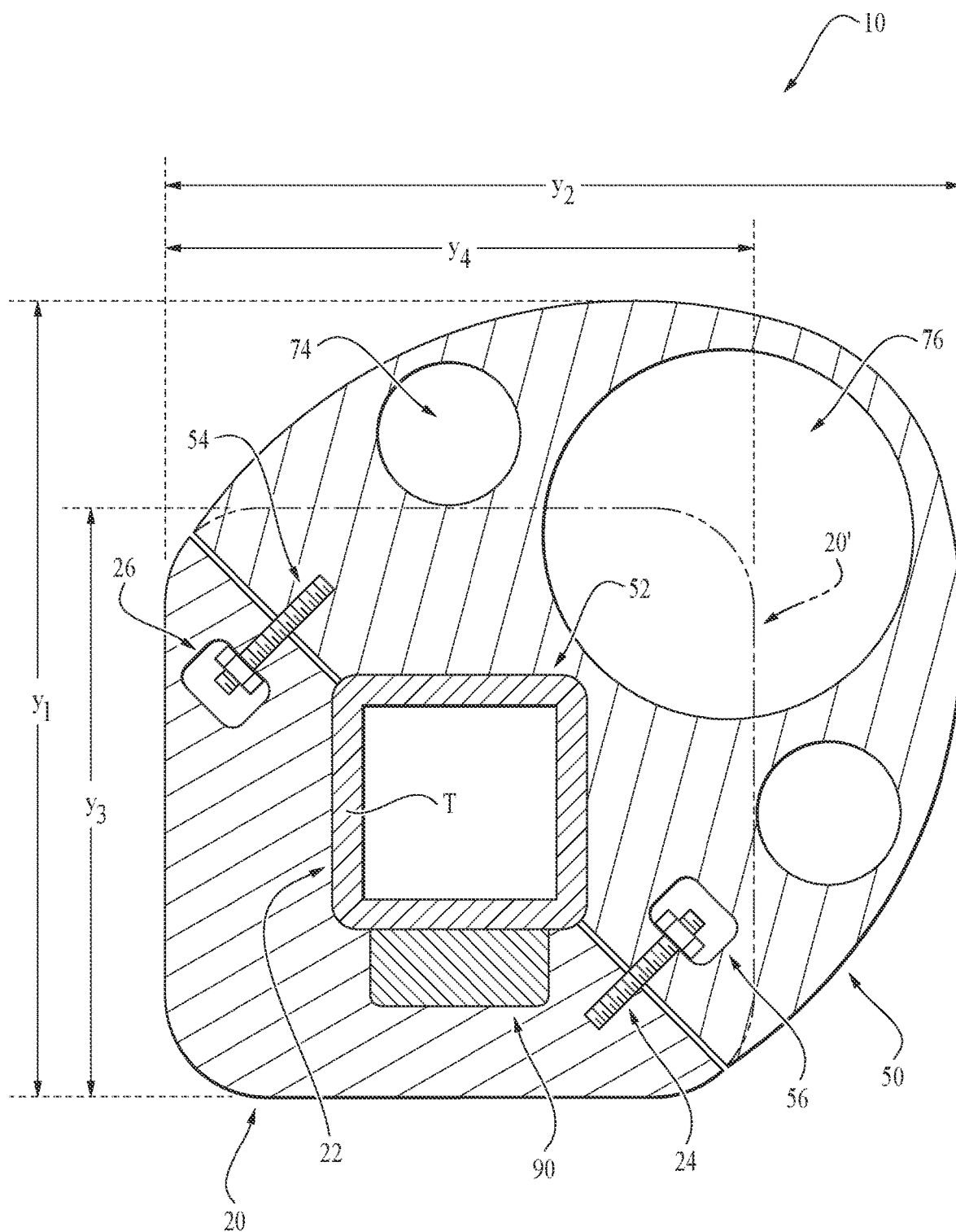
FIG. 2 shows a cross sectional view of the clamp of FIG. 1.
Figure 3:
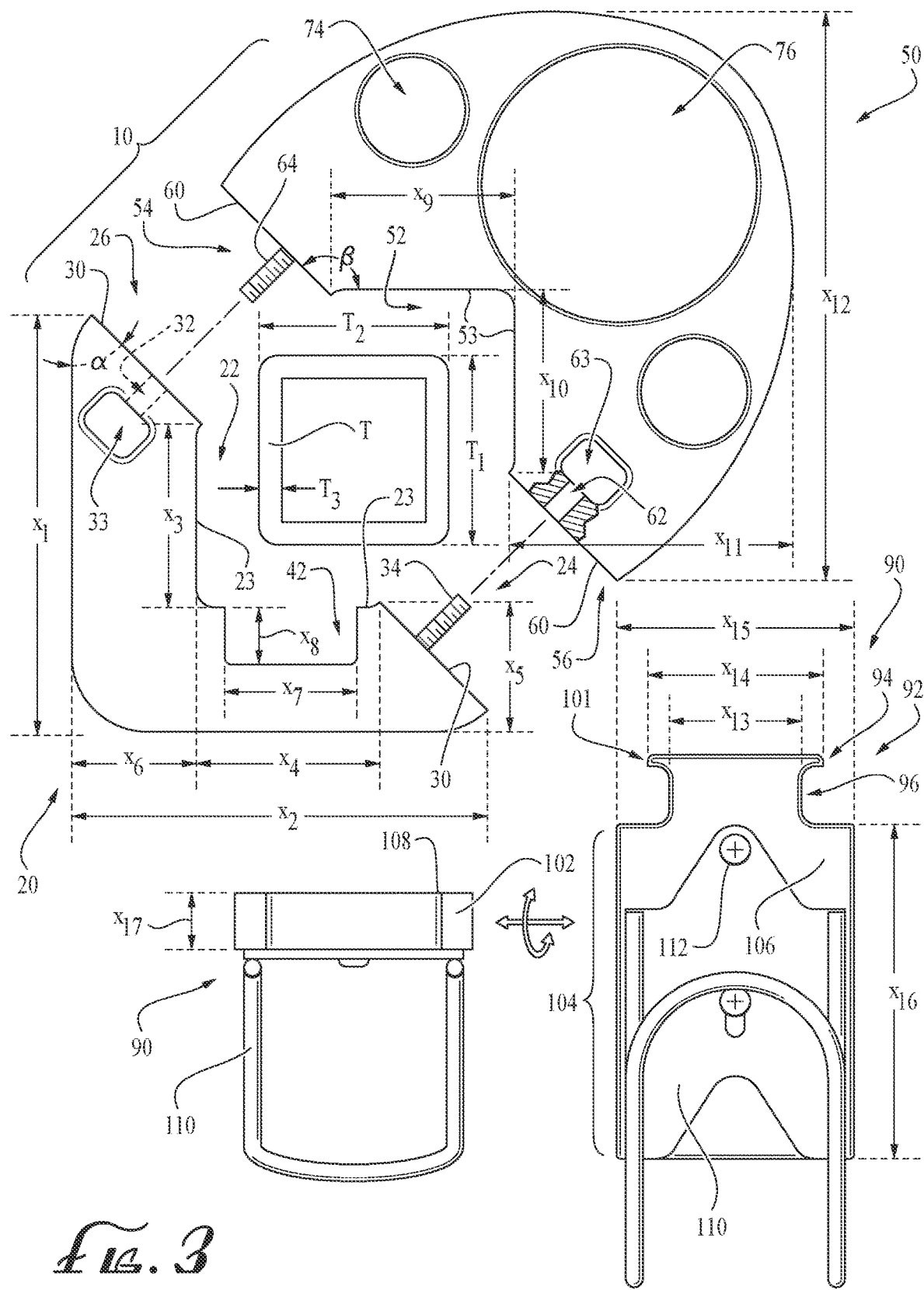
FIG. 3 shows a top assembly view of the clamp of FIG. 1.

FIGS. 2-3 show the bracket assembly 10 in greater detail. According to example embodiments, the bracket assembly 10 comprises a first component or bracket 20 and a second component or bracket 50, the two of which are configured for removable engagement with each other and to collectively frictionally engage the tube T extending therebetween. According to example embodiments, the bracket assembly 10 may comprise at least one clamping portion, at least one coupling portion and at least one attachment or mounting portion. According to the depicted example embodiment, the first and second brackets 20, 50 comprise clamping portions 22, 52, coupling portions 24, 26, 54, 56, and a mounting portion 74, 76, 90.

According to one example embodiment, the assembled bracket assembly 10 defines a footprint comprising outermost dimensions defining a first length y1 and a second length y2 (see FIG. 2). According to example embodiments, the lengths y1, y2 are between about 5-20 inches, for example between about 6-15 inches according to some preferred embodiments, and for example between about 7.5-7.7 inches according to the depicted embodiment. According to additional example embodiments (as will be described in greater detail below), the bracket assembly may comprise two of the same bracket (e.g., 20 and 20' as an example in FIG. 2), for example, so as to define outermost dimensions having a first length y3 and a second length y4. In example embodiments, the lengths y3, y4 are between about 3-12 inches, for example between about 4-10 inches, for example between about 5.5-8.5 inches according to one example embodiment. According to the depicted embodiment of FIG. 2, the length of y1, y2 is about 7.65 inches and the length of y3, y4 is about 6 inches.

As depicted in FIG. 3, the first bracket 20 comprises a component or member defining first and second arms comprising first connected ends and second free ends outwardly and transversely extending therefrom. The clamping portion 22 is defined along inner sides of the first and second arms and comprises at least one clamping surface 23 to be frictionally engaged with at least one surface of the tube T. According to the depicted embodiment, the clamping surface 23 is configured to frictionally engage with two of the four sides of the tubing T. First and second coupling portions 24, 26 may be provided at the second free ends of the first and second arms. In example embodiments, the coupling portion 24 comprises a threaded bolt or fastener 34 and the coupling portion 26 comprises an opening 32 and adjoining passageway or cutout 33. According to example embodiments, the coupling portions 24, 26 may comprise coupling or engagement faces 30 that are oriented to define an included angle α relative to their respective arm extension direction. According to one example embodiment, the angle α is generally between about 1-170 degrees, for example between about 25-90 degrees, for example about 45 degrees according to one preferred embodiment. According to other example embodiments, the engagement faces 30 may be oriented as desired.

The second bracket 50 may be generally similar to the first bracket 20, for example, by at least comprising a clamping portion 52 and coupling portions 54, 56, both of which are substantially similar or at least compatible with their respective portions of the first bracket 20, for example to permit removable engagement between the coupling portions to permit frictional engagement of the clamping portions 22, 52 with at least a portion of the tube's T outer surface profile.

In example embodiments, the second bracket 50 comprises a component or member defining a rounded outer periphery or parabola-like shape having a maximum length at its midpoint thereof and outwardly curving in a symmetrical manner towards coupling portions 54, 56 and terminating at engagement faces 60 thereof, and for example, with the clamping portion 52 positioned therebetween and comprising at least one clamping surface 53 providing for frictional engagement with at least one surface of the tube T. According to the depicted embodiment, the clamping surface 53, in a similar manner to the clamping surfaces 23 of the bracket 20, comprises a pair of clamping surfaces 53, which are generally transversely oriented relative to each other and configured to frictionally engage with two of the four sides of the tubing T. In example embodiments, the engagement faces 60 are substantially similar to the engagement faces 30 of the coupling portions 24, 26. In example embodiments, each face 60 defines an included angle β relative to the clamping surface 53 most proximal thereto (see FIG. 3). According to one example embodiment, the angle α is generally between about 1-170 degrees, for example between about 45-165 degrees, for example about 135 degrees according to one preferred embodiment. According to other example embodiments, the engagement faces 60 may be oriented as desired.

According to example embodiments, the coupling portions are removably connected together by threaded fastener 34 (e.g., a bolt or the like) of the bracket 20 being received within the opening 62 of the bracket 50, and with a threaded fastener 64 of the second bracket 50 being received within the opening 32 of the bracket 20, thereby generally providing that the engagement faces 30, 60 are facing each other and generally parallel relative to each other. Thereafter, a threaded nut or other compatible coupling member 36 can be fastened to the threaded fasteners 34, 64, forcefully drawing the brackets 20, 50 together towards each other, thereby facilitating the frictional engagement of the clamping portions thereof with at least a portion of the tube's T outer surface profile. According to example embodiments, the cutouts 33, 63 are sized and shaped so as to permit the threaded nut to be inserted therein and attached to its respective threaded fastener or compatible coupling member. In example embodiments, the cutouts 33, 63 may be configured for access by a tool or wrench for tightening or loosening. According to some example embodiments, a tool or other wrench can be substantially low profile and minimal to permit operation thereof while inserted within the cutout 33, 63.

According to the depicted embodiment of FIG. 2, at least some amount of spacing is provided between the faces 30, 60 prior to them being drawn towards each other by tightening of the threaded nuts, for example, so that the faces 30, 60 do not prematurely engage with each other prior to the clamping surfaces 23, 53 achieving a sufficient amount of frictional engagement with the tube T. According to example embodiments (as will be described in greater detail below), one or more frictional enhancements may be provided with the clamping surfaces 23, 53 to further enhance the frictional engagement with the tube T.

According to example embodiments, one or more mounting portions may be provided in various forms and locations relative to one or more of the brackets 20, 50. For example, according to the depicted example embodiment of FIGS. 1-3, the second bracket 50 comprises openings 74, 76, which may be useful in receiving one or more portions of an object or component, etc. that are intended to be hung thereon or attached thereto, most commonly temporarily, however some items or components may be permanently attached to one or more of the brackets 20, 50 as desired. According to the depicted example embodiment, a pole of the brush B is retained within the opening 76 and a handle of the nozzle N that's attached to the end of the hose H is received by one of the openings 74.

According to other example embodiments, various other items or components, devices, etc. can be utilized in one way or another with one or more openings formed with one or more of the brackets of the bracket assembly 10. For example, one or more openings can be provided with each bracket to retain a cup holder insert or cup, or may be provided to retain one or more elongate components such as fishing rods, kayak paddles, or the like. According to one example embodiment, the bracket assembly may form a circular array of one or more openings that are configured for holding or retaining, at least temporarily, one or more desired items.

According to one example embodiment, one of the clamping surfaces 23, 53 may comprise a mounting portion at least partially formed therewith, for example, in the form of a cutout 42 according to one example. In example embodiments, the cutout 42 is formed along a portion of the clamping surface 23 and permits the removable connection of an attachment component 90 thereto. In example embodiments, the attachment component 90 may comprise a coupling portion 92 and a mounting or accessory portion 104. In example embodiments, the coupling portion 92 may comprise a keyed cutout 94 having a central neck 96, upper engagement lips 101 outwardly extending from the neck 96, and a lower base engagement surface 102. According to example embodiments, the upper lips 101 and engagement surface 102 are configured to sit atop the bracket 20 when the attachment component 90 is removably engaged with cutout 42. The mounting portion 104 comprises an attachment surface 106 defining an area wherein one or more mounting components, hanging devices or structures, hoisting components, couplings, attachments or strapping components (hereinafter collectively "accessory mounts") 110 may be connected, for example, wherein one or more fasteners 112 may be provided for permanently or removably securing the accessory mounts 110 thereto. According to example embodiments, a surface on an opposite side of the surface 106 near the neck 96 of the attachment component 90 is configured to act as a clamping surface in unison or collaboration with the clamping surface 23. Accordingly, while the bracket 20 may appear as though the clamping surface 23 of the clamping portion 22 is substantially lacking from a portion thereof (e.g., due to the cutout 42), the removable attachment of the attachment component 90 within the cutout fills the void thereof such that a surface of the attachment component near the neck thereof acts as a clamping surface (see FIG. 2).

According to the depicted example embodiment, the accessory mount 110 is in the form of a plate comprising universal hook-like projection extending therefrom. As shown in FIG. 1, the wound hose H is captured by the hook-like projection to maintain its position until a user desires to remove it. In example embodiments, the plate is attached to the attachment surface 106 with threaded screws 112. Optionally, other accessory mounts can be configured for engagement with one or more portions of the attachment component as desired. According to some example embodiments, one or more attachment components 90 can be configured for removable attachment together, or for example, an attachment component may be provided for joining one or more bracket assemblies together (see FIG. 6). In example embodiments, the attachment surface 106 of the attachment mount may be configured to removably receive one or more fasteners, or for example, a fastener can be permanently attached to a portion thereof, for example, to provide for a coupling or engagement component for whatever may be supported thereby.

In example embodiments, the clamping surfaces 23, 53 may be sized, shaped and oriented to provide a sufficient amount of frictional engagement with the exterior surface of the tube T, for example, to remain engaged thereto under a load being applied to the bracket assembly 10 by one or more objects or items mounted or connected thereto. According to example embodiments, the bracket assembly 10 can support a load of up to about 100 pounds, for example up to about 150-200 pounds according to some example embodiments. According to example embodiments, the thickness of each bracket 20, 50 is at least about 0.5 inches, for example about 0.75 inches according to one example embodiment. According to alternate embodiments, however, the thickness of the bracket may be greater than 0.75 inches, for example, between about 1-2 inches according to some example embodiments. Furthermore, according to another example embodiment, two or more brackets of the same shape may be permanently attached together to provide for a greater thickness as desired. According to other example embodiments, the brackets are molded such that the thickness thereof can be chosen as desired, for example, between about 0.5-1.5 inches according to example embodiments.

As depicted in FIGS. 1-3, the tube T to be frictionally engaged by the bracket assembly 10 is generally square in cross section and typically comprises a first pair of sides having a length of T1, a second pair of sides having a length of T2, and a wall thickness T3. In example embodiments, the tube's T cross section is square where the lengths T1, T2 of the sides thereof are of an equivalent length, typically between about 1-6 inches, for example between about 2-4 inches according to one example embodiment. However, according to other example embodiments, the lengths T1, T2 may be less than 1 inch or greater than 6 inches. According to one example embodiment of the present invention, the lengths T1, T2 are not substantially identical to each other, and thus the tube T comprises more of a rectangular cross-sectional shape, for example, such that the lengths of the surfaces of the clamping portion of each bracket may be adjusted to accommodate fitting against about ½ of the outer surface profile of the tube. According to example embodiments, the clamping portion of each bracket of the assembly may be sized, shaped and configured to frictionally engage with at least about 25% of one or more of the tube's surfaces. According to another example embodiment, the clamping portion of each bracket may be sized, shaped and configured to engage with about 90% of 50% of the tube's T outer surface profile. Accordingly, in an example embodiment where the tube T comprises a cross-sectional shape other than square (e.g., circular, oval, polygonal or other desired shape), the clamping portion of each bracket may comprise clamping surfaces that are shaped accordingly so as to provide for a sufficient amount of surface engagement with the tube's T outer surface profile. According to example embodiments, the tube T depicted herein is generally metal. However, according to other example embodiments, the tube T may be comprised of various other materials including but not limited to wood, concrete, sheet rock, other metals, plastics, and/or other materials or combinations thereof.

According to one example embodiment, for example when the tube T comprises a square cross section, each clamping surface 23, 53 may be configured to be generally transversely oriented and sized to engage with at least a portion of two surfaces of the tube T. According to other example embodiments, the clamping surface 23, 53 is preferably shaped to provide for sufficient frictional engagement with the outer surface of the tube T when the coupling portions are secured. Thus, according to example embodiments, clamping surfaces 23, 53 are at least partially shaped to some extent such that a sufficient amount of frictional engagement between the brackets and tube occurs when the coupling portions are secured together. According to other example embodiments, the clamping surfaces 23, 53 are substantially similar in the size and shape of about 50% of the tube's outer surface profile. According to some example embodiments, one or more coatings, additives, layers, materials, components, inserts, or other frictional enhancements may be incorporated with one or more portions of the clamping surfaces 23, 53. According to one example embodiment, one or more female receivers may be formed along the surfaces 23, 53 and configured to receive a male insert, that of which is configured to project beyond the surfaces 23, 53 and enhance the bracket assembly's 10 frictional engagement with the tube T.

The bracket assembly can preferably be dimensioned as desired to provide for frictionally engaging a tube or other support comprising a desired cross-sectional shape and size. Referring to bracket 20 of the depicted embodiment of FIG. 3, the first arm comprises a length x1 and a width x6, the second arm comprises a length x2 and a width x5, and the clamping surface 23 of each arm (collectively the clamping portion 22) comprise lengths x3, x4. Furthermore, the cutout 42 of the second arm comprises a width x7 and a depth x8. Referring to bracket 50, the clamping surface 53 of each arm (collectively the clamping portion 52) comprise lengths x9, x10, and a side or half of the curved component comprises a width x11 and a length x12. Referring to the attachment component 90, the neck 96 comprises a width x13, a width x14 is defined between the lips 101 and a width x15 is defined between the outermost sides of the lower base engagement surface 102. The mounting portion comprises a length x16, and the entirety of the attachment component comprises a thickness x17. According to the depicted example embodiment, x1, x2 are between about 5-6 inches, x3, x4, x9 and x10 are between about 2.3-2.5 inches, x5, x6 are between about 1.5-2 inches, x7 is between about 1.5-2 inches, x8 is about 0.75 inches, x11 is between about 2-6 inches, x12 is between 5-10 inches, x13 is between about 1.5-2 inches, x14 is between about 1.55-2.05, x 15 is between about 2.25-4 inches, x16 is between about 2.5-12 inches, and x17 is about 0.75 inches. According to other example embodiments, the dimensions of the brackets and shapes thereof can preferably be chosen as desired, for example, to at least provide clamping surfaces compatible for frictionally engaging at least a portion of an outer surface of a support post or tube. According to one example embodiment, the dimensions as described herein may be up to at least 15%-95% greater than or less than the example dimensions provided herein.

Figure 4:
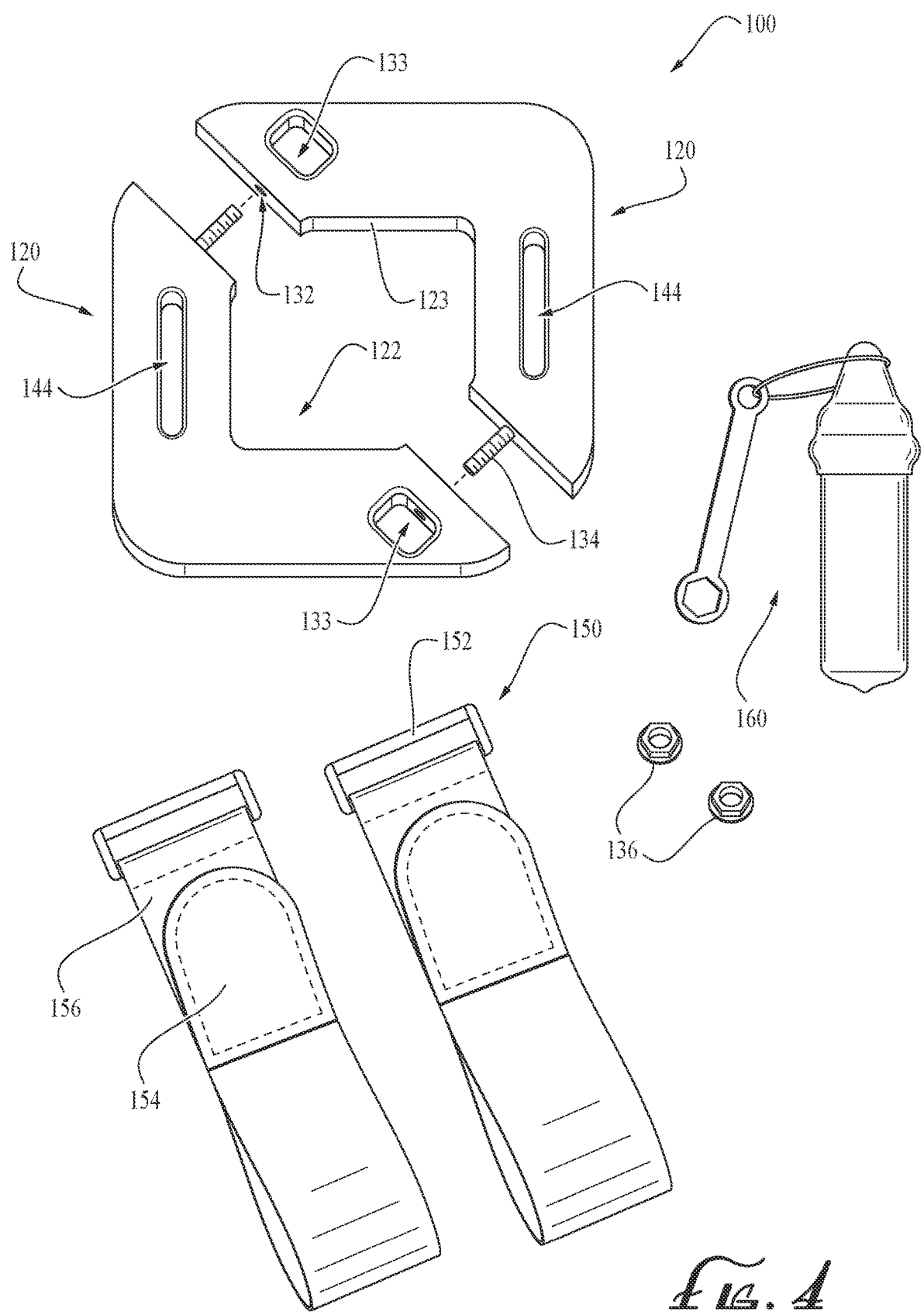
FIG. 4 shows a perspective view of a clamp according to another example embodiment of the present invention, the clamp being disassembled to show the various components thereof.

FIG. 4 shows a bracket assembly 100 according to another example embodiment of the present invention. In example embodiments, the bracket assembly comprises two identical brackets 120 that are oriented relative to each other so as to provide for removable engagement therebetween, the removable engagement thereof providing for frictional engagement of a coupling portion 122, 123 of each bracket 120 to engage with two adjacent sides of the tube. As similarly described above, each bracket 120 comprises a coupling portion in the form of a female coupling element 132 and a male coupling element 134. Generally elongate openings 144 are formed along a portion of an arm of the bracket 120 and configured to retain a stop or buckle 152 of a mounting or attachment component 150. In example embodiments, the attachment component 150 comprises buckle 152 comprising an elongate strap 156 and free end 154. In example embodiments, the buckle 152 comprises a width that is at least partially greater than the length of the opening 144, for example, such that the buckle 152 is retained and prevented from passing through the opening 144 and while the strap 156 and free end 154 are permitted to pass therethrough so as to permit attachment and detachment of the free end 154 from the strap 156 (e.g., hook and loop attachment according to example embodiments) to wrap itself around one or more components or objects to retain or hold the same. As depicted, each bracket 20 comprises one opening 144, however two or more openings of a desired size and shape may be provided.

Figure 5:
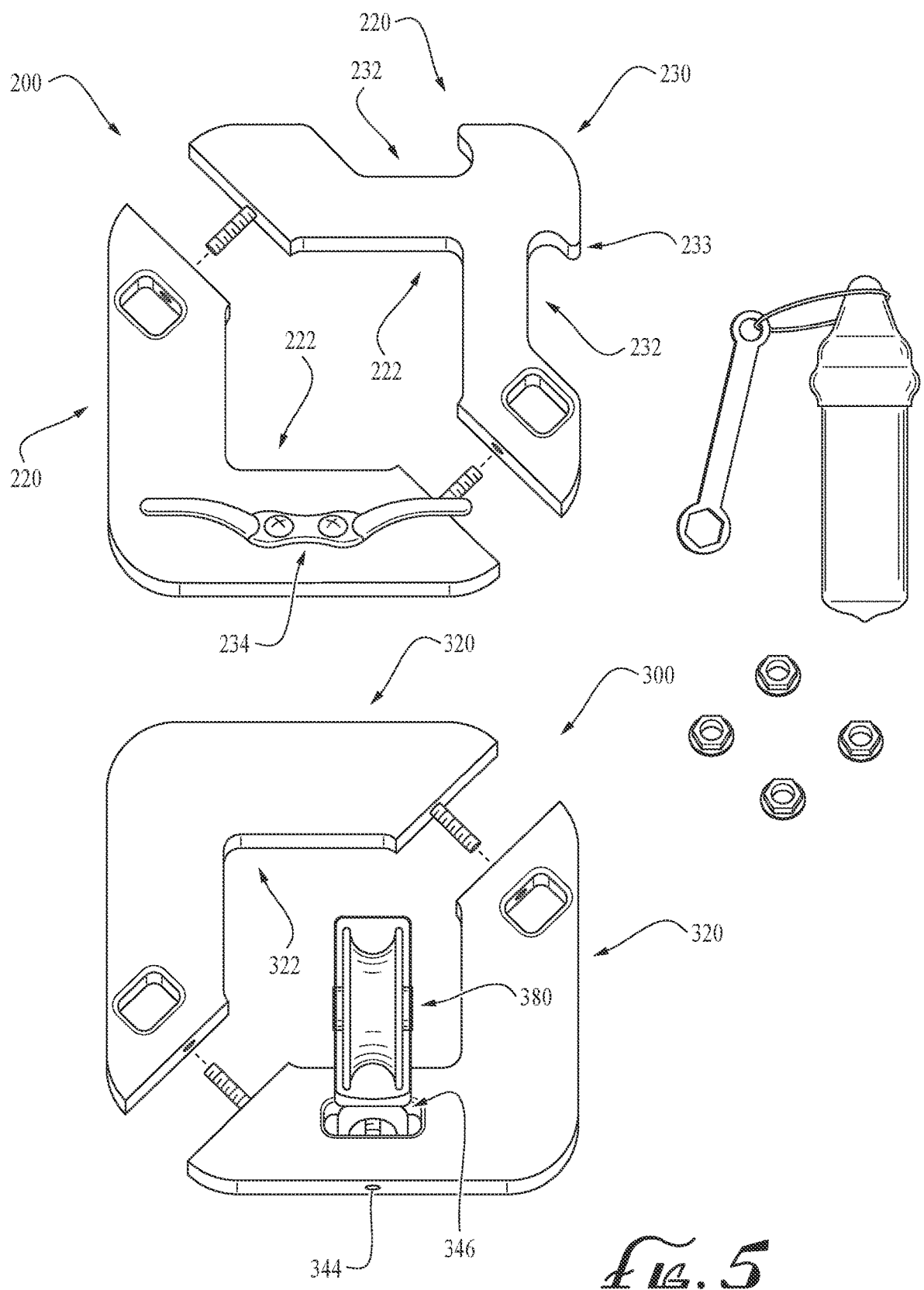
FIG. 5 shows a perspective view of a clamp according to another example embodiment of the present invention, the clamp being partially disassembled to show the various components thereof.

FIG. 5 shows bracket assemblies 200, 300, which according to some example embodiments can be configured for co-attachment to the same tube and positioned a distance away from each other. According to example embodiments, one of the brackets 220 of the bracket assembly 200 comprises a pair of cutouts 232 along opposite outer sides thereof so as to define a pronounced corner 230 comprising engagement shelves 233. And the other bracket 220 comprises a marine cleat mounted to an arm portion thereof. And according to example embodiments, a bracket 320 of the bracket assembly 300 comprises a cutout 346 having a fastener extending therethrough, for example, wherein an eyelet or receiver of a pulley 380 is attached, for example, such that a large item or object (e.g., large float, water toy etc.) may be attached to a rope and hoisted and suspended out of the way from the user, or for example, to maximize the walking space of the deck D and reduce or minimize objects that could pose as a tripping hazard. In example embodiments, the bracket assembly 300 is typically frictionally engaged with the tube nearby where the object to be suspended is intended to be positioned (typically 4-15 feet above the ground or waling surface), and the bracket assembly 200 is frictionally engaged to the same tube lower closer to the ground surface and accessible by a user, for example, to manipulate the rope that passes through the pulley and back to the pronounced corner 230 and/or cleat 234 of the bracket assembly 200.

Figure 6:
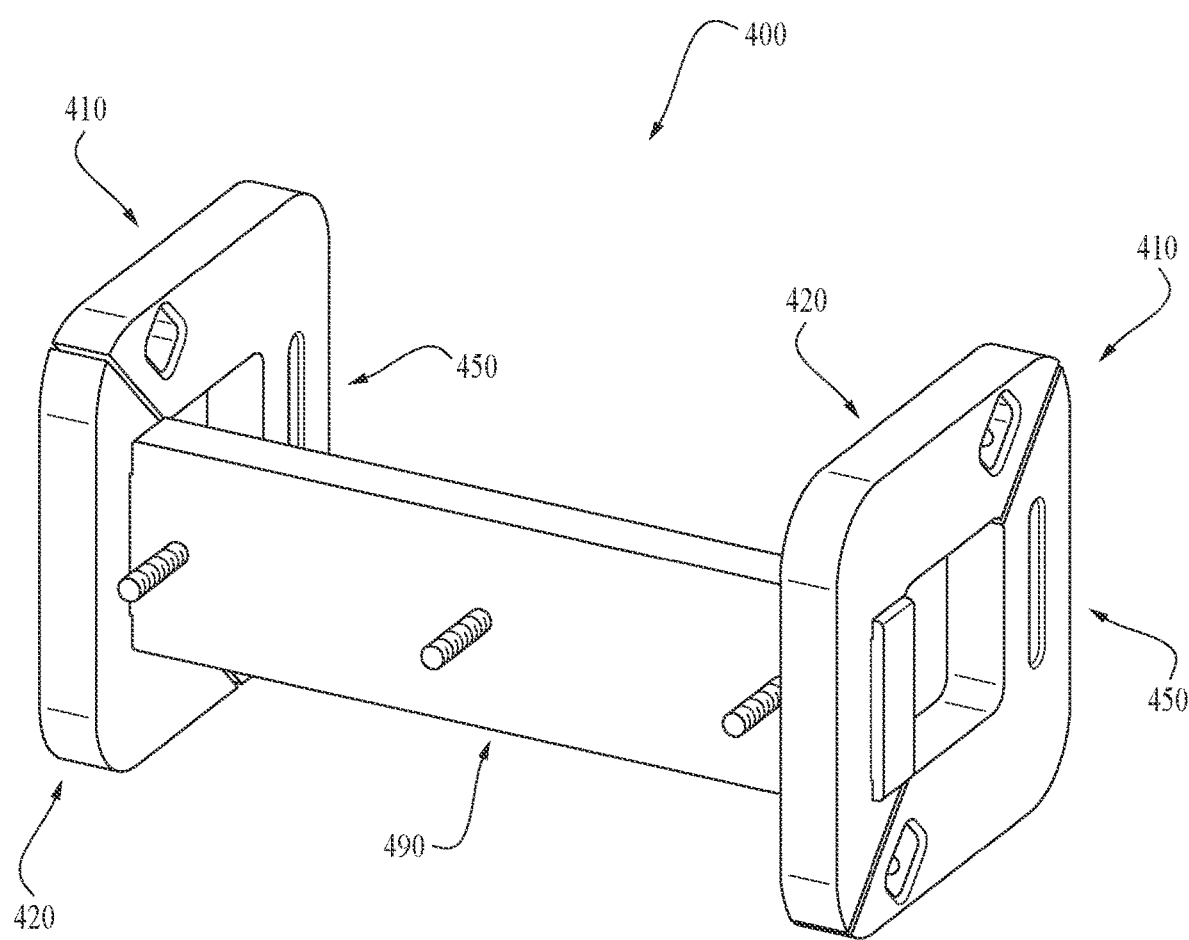
FIG. 6 shows a perspective view of a clamp according to another example embodiment of the present invention.
Figure 7:
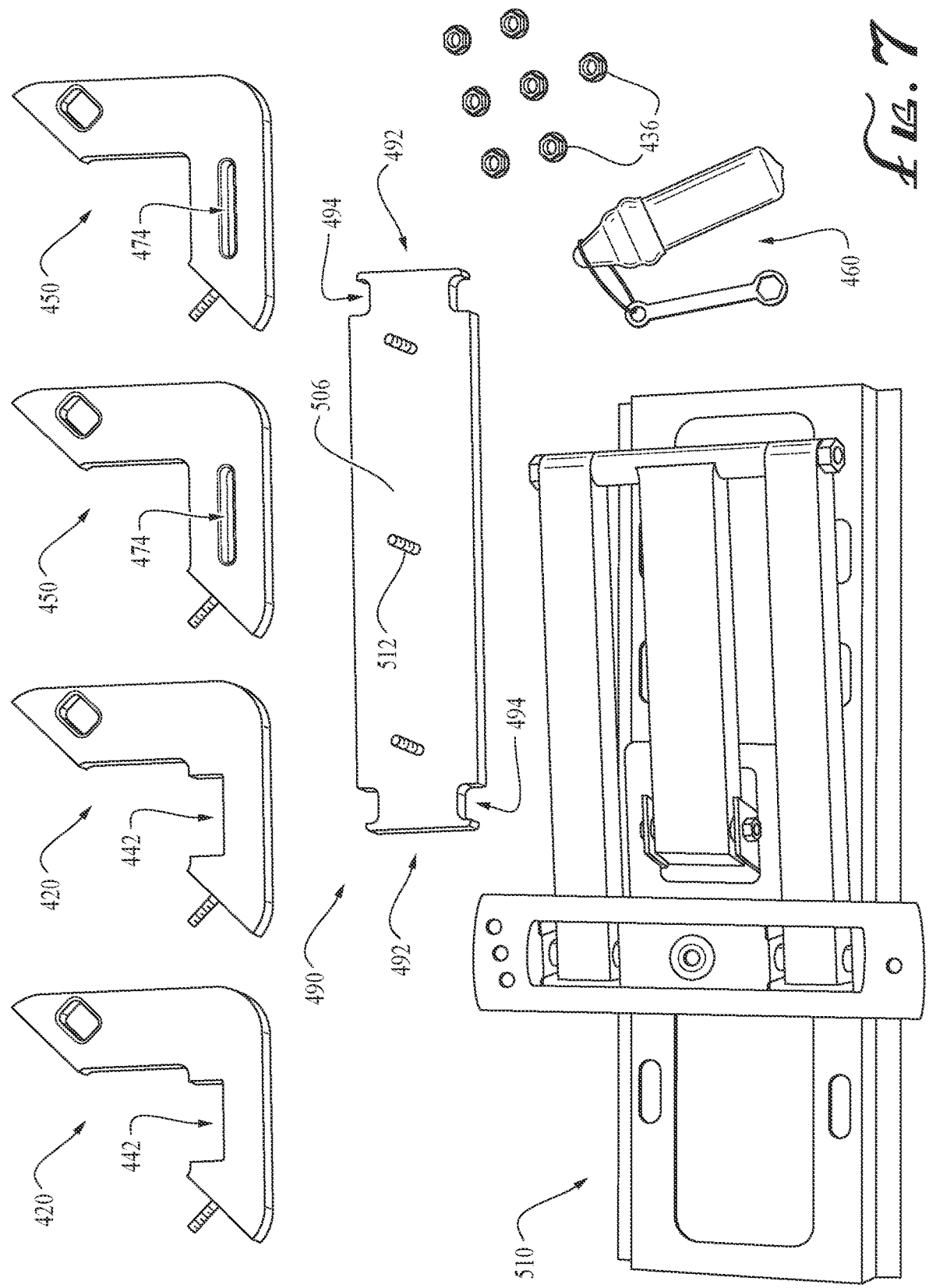
FIG. 7 shows the clamp of FIG. 6 disassembled, and showing an accessory item to be assembled therewith.

FIGS. 6-7 show a bracket assembly 400 according to another example embodiment of the present invention. According to example embodiments, the bracket assembly 400 comprises a pair of bracket assemblies 410 that are spaced apart and connected together by an attachment component 490. Each bracket assembly generally comprises a first bracket 420 comprising a cutout 442 and a second bracket 450 comprises an elongate opening similar to opening 144 of bracket 120 shown in FIG. 4 for receiving the attachment component 150 (or the like).

The cutout 442, which is formed in bracket 420 of each bracket assembly 410, is preferably sized and shaped to permit removable engagement with a keyed cutout 494 that is provided at the ends of the attachment component 490. The attachment component 490 may comprise one or more fasteners permanently connected to an attachment surface 506 thereof, for example, threaded fasteners 512 that can be configured to receive a threaded nut 436. According to one example embodiment, a television mount 510 may be mounted to the attachment component 490, for example such that a television or monitor can be mounted to the mount 510, and thus, indirectly mounted to the tube a desired distance or height above the walking surface. According to example embodiments, the bracket assembly 400 is preferably designed to support a substantial amount of weight, for example, at least about 100-200 pounds. According to some example embodiments, attachment component 490 may be configured for removably receiving at least a portion of a large industrial fan, or for example, other desired equipment or components that may comprise a weight that is 25 pounds or more.

Figure 8:
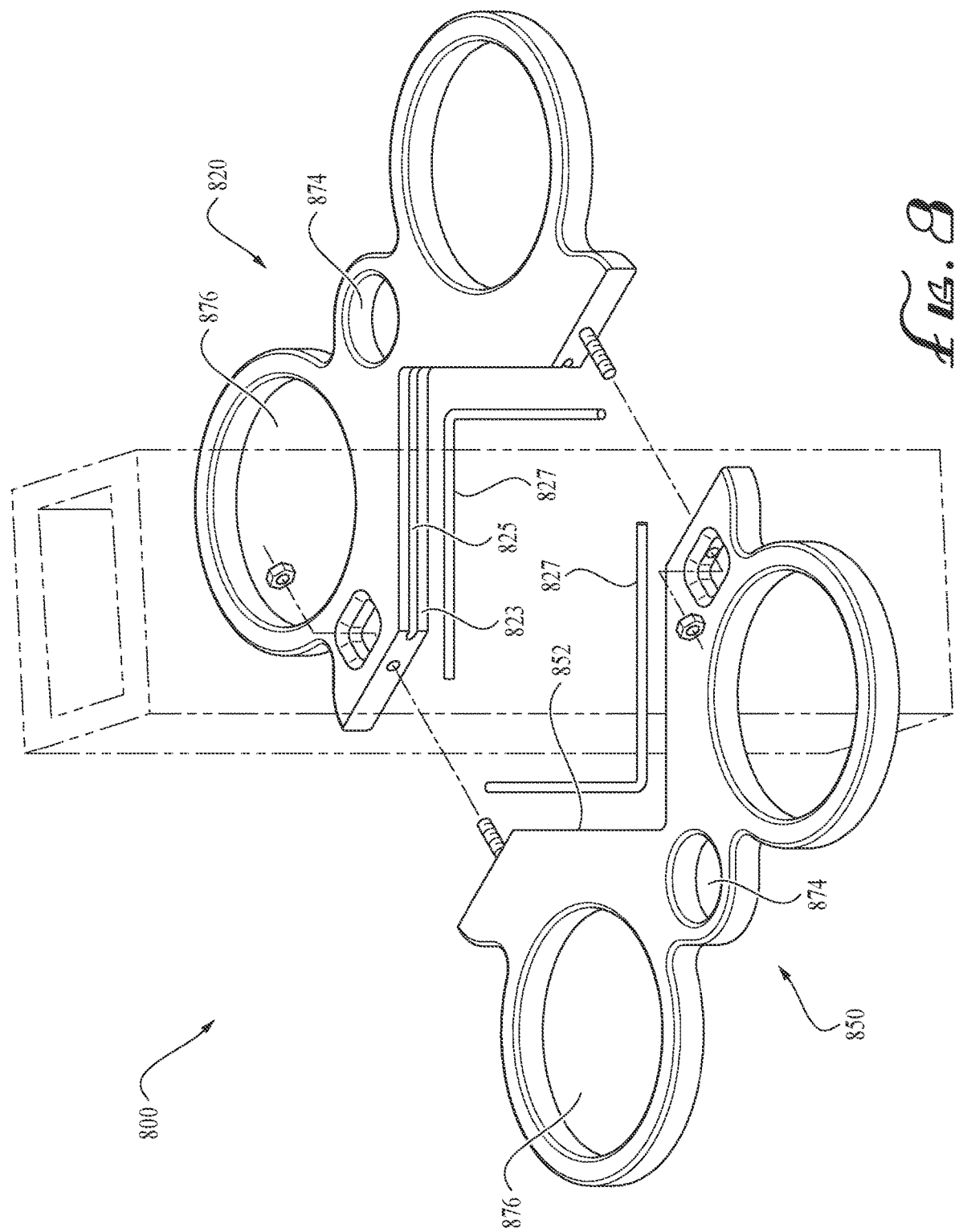
FIG. 8 shows an embodiment of a clamp, also referred to as a mounting assembly, which includes a gripping strip and configured with four apertures for beverages.

FIG. 8 shows a mounting assembly 800 according to yet another example embodiment of the present disclosure. Clamping surfaces 822 and 852 include a groove 825 into which a gripping strip 827 is seated. Gripping strip 827 can be rubber, silicone, or other flexible or resiliently compressible material to provide additional grip on the support structure. Although not depicted, a groove and gripping strip can also be included on embodiments having a cutout on the clamping surface (such as cutout 442 as shown in FIG. 7). The groove and gripping strip can either be discontinuous to avoid the cutout or can be continuous to provide grip on an accessory when mounted in the cutout. The depicted embodiment includes four cutouts 876 that can hold a cup, can, insulated tumbler or the like. Cutouts 874 can be used to mount or hang tools or accessories. As described above, the brackets 850 and 820 can be provided in different shapes or with different cutout arrangements according to need.

Figure 9:
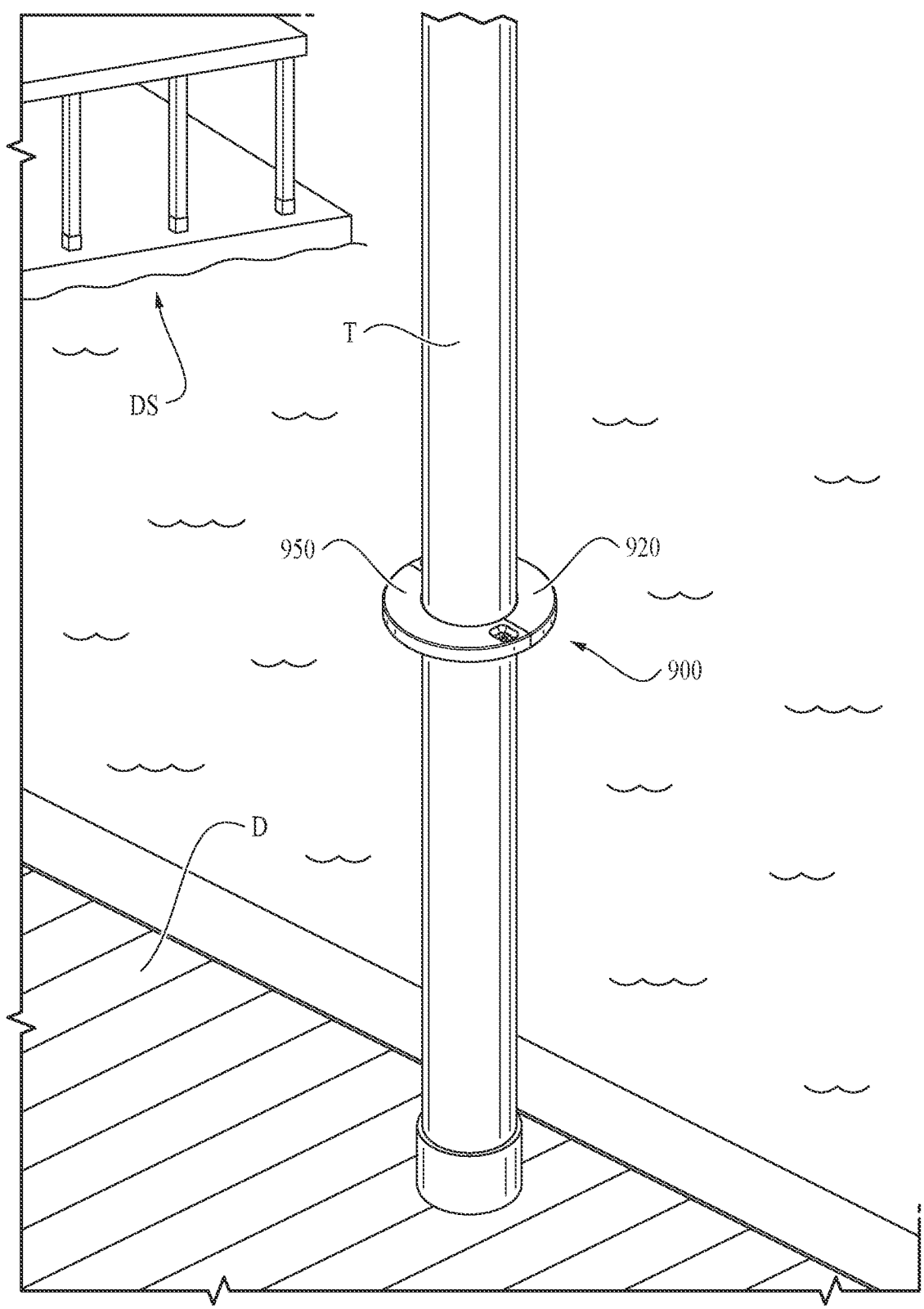
FIG. 9 shows a mounting assembly having a circular inner aperture and mounted to a cylindrical support structure.

FIG. 9 shows a mounting assembly 900 mounted to a cylindrical support structure T, wherein the inner aperture is circular to attach to the support structure. The depicted embodiment is formed from brackets 920 and 950, which are not shown with any mounting cutouts or accessories. The depicted embodiment shows a standard base block without cutouts. The external diameter can be expanded to accommodate varying patterns of accessory attachments where the accessory attachments can include such as apertures, hooks, reliefs, or combinations thereof. The mounting assembly can also include small holes for towels, carabiners, and the like. The outer dimension and shape can be customized to the needs of a user, and/or additional intended applications or modes of use, and the invention is not limited to the particular example embodiments and configurations shown and described.

Figure 10:
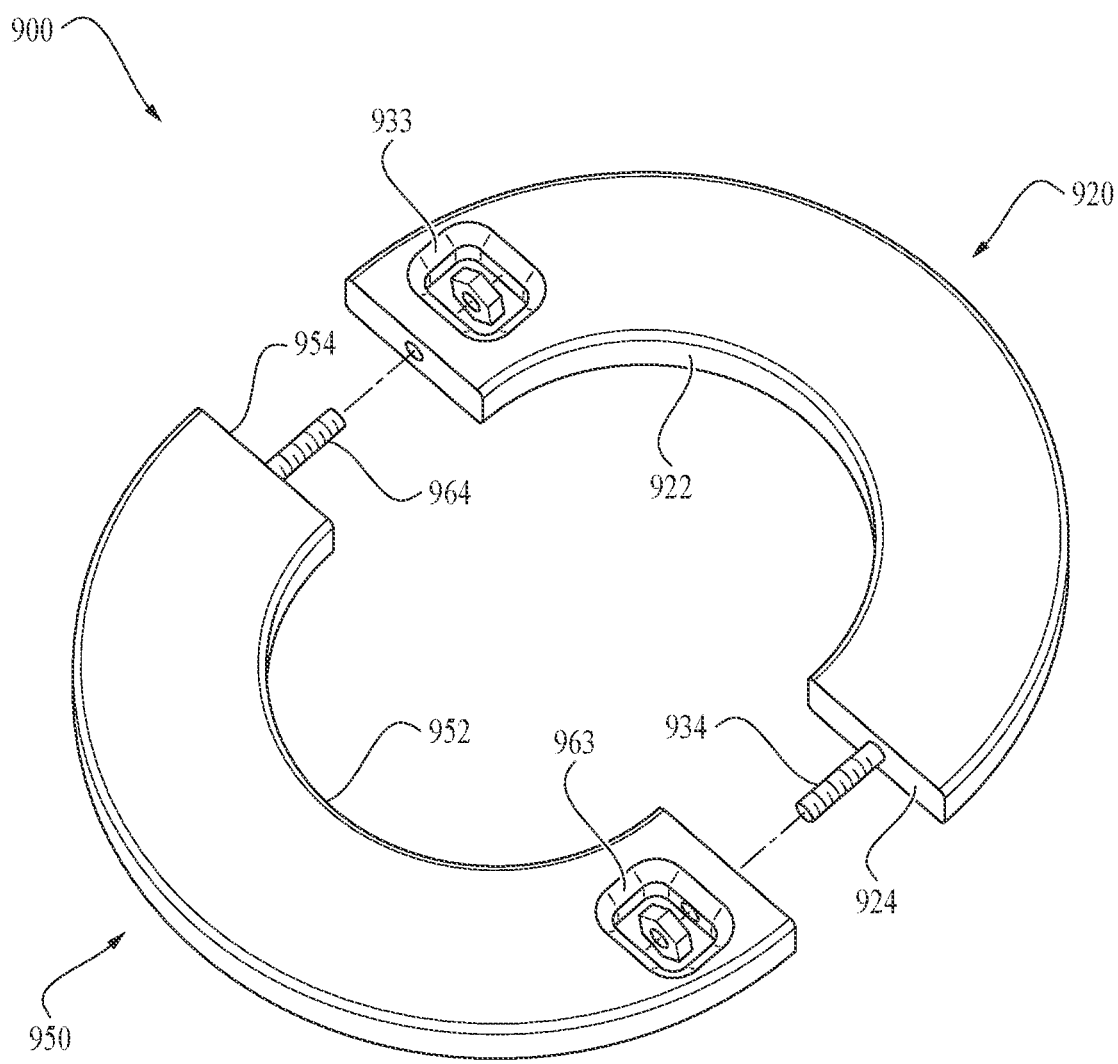
FIG. 10 shows a disassembled view of the mounting assembly shown in FIG. 9.

FIG. 10 shows the mounting assembly 900 in greater detail, illustrating the clamping surfaces 922 and 952 formed to receive a round support structure.

FIGS. 11 and 12 show a mounting assembly 1100 according to another embodiment. The coupling portions 1124, 1126 of bracket 1120 each include a male coupling element 1134. The coupling portions 1154, 1156 of bracket 1150 each include a female coupling element 1164 configured to receive the male coupling element. Because the female coupling elements 1164 use more surface area on the bracket than do male coupling elements, by including the male coupling elements on bracket 1120, bracket 1120 can have a smaller external dimension such that it can be placed in tighter areas. For example, where a support structure T is situated close to a wall and there is limited space between the support structure T and the wall, bracket 1120 can be placed in the space. In alternative embodiments, bracket 1120 can have similar or larger external dimensions than bracket 1150 but can include the two male coupling elements.

Complementary bracket 1150 can be placed on the opposite side of the support structure T and can have a larger external dimension for mounting accessories. In the depicted embodiment, a cage to hold sports balls (e.g. tennis, pickleball) is mounted beneath cutout 1176. However, various alternative configurations of accessory mounts can be contemplated as described herein.

Figure 13:
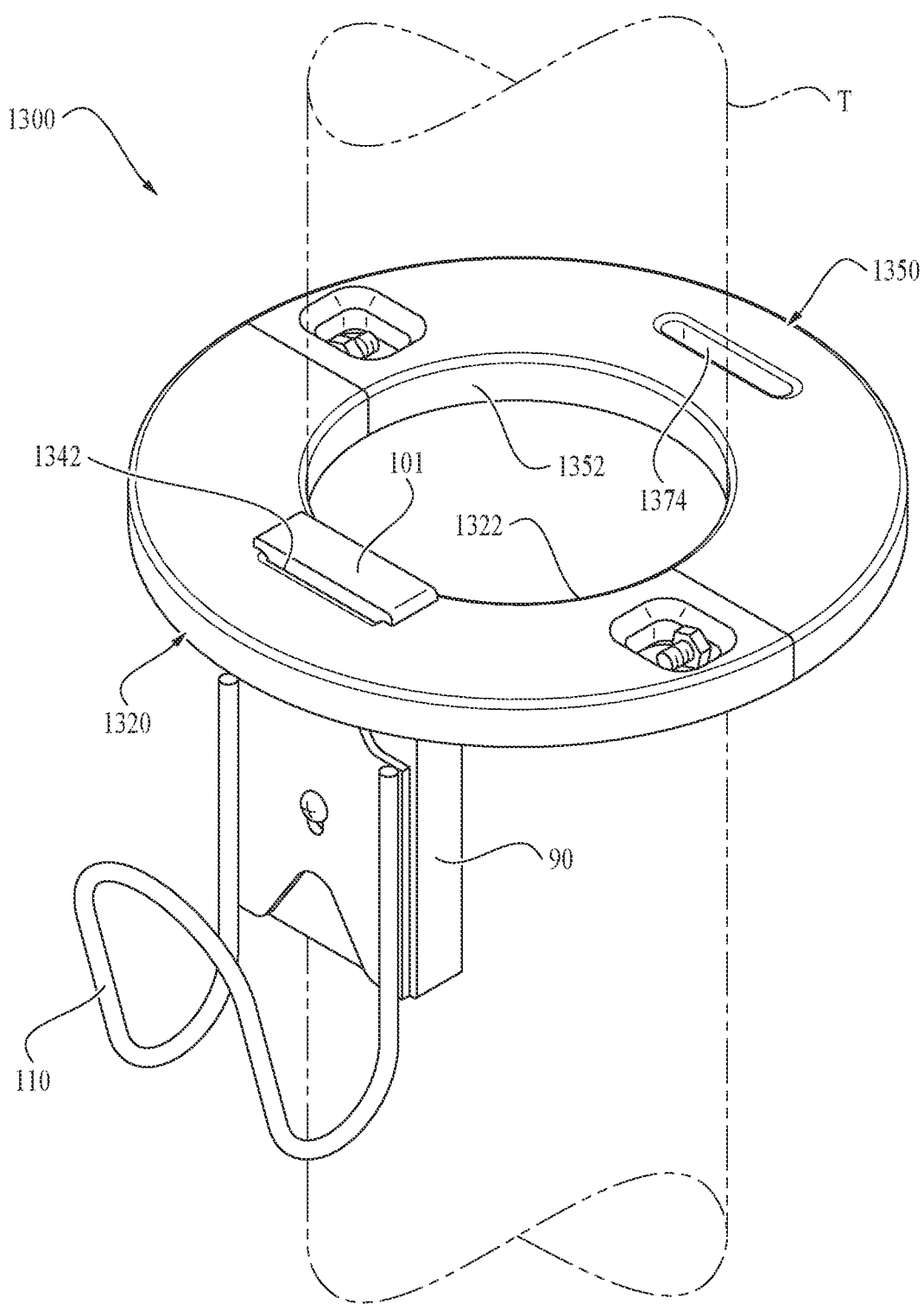
FIGS. 13 and 14 show another embodiment of a mounting assembly in accordance with the present disclosure, configured to receive a cylindrical support structure. The mounting assembly includes an opening and a cutout for removably engaging with an attachment component for an accessory.
Figure 14:
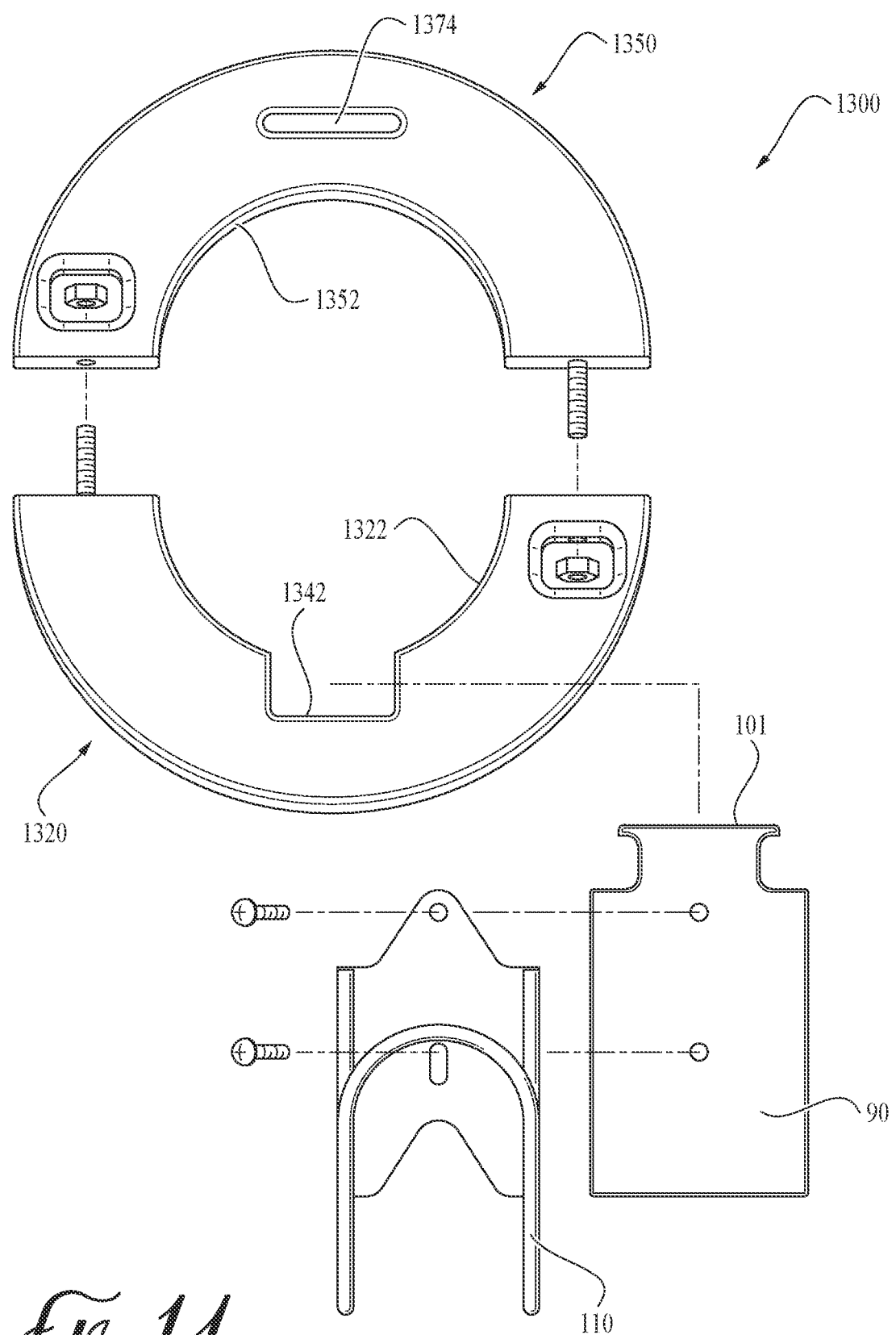

FIGS. 13 and 14 show a mounting assembly 1300, which includes an opening 1374 and a cutout 1342. The mounting assembly is configured to receive a cylindrical support structure in the internal aperture formed by clamping surfaces 1323 and 1352. Attachment component 90, as described in FIG. 3, is removably engaged with cutout 1342. An accessory mount 110 is affixed to attachment component 90. When the mounting assembly 1300 is engaged with the support structure T, the support structure T provides additional force to maintain engagement between bracket 1320 and attachment component 90.

While attachment component 90 is depicted as connected to an accessory mount 110 used to store hoses or cords, accessory mount 110 can be selected from a variety of accessories that can be attached to attachment component 90. Attachment component 90 can be used as a blank mounting pad such that it can accept various accessories according to need. Cutout 1374 is shown as a slit, which can receive straps or hook and loop fasteners for hanging and attaching accessories or storing items. The attachment component 90 can be provided in various sizes and materials to accommodate various accessories. The attachment component 90 can have neck dimensions of neck 96 and engagement lips that are sized to mate with a cutout. In some embodiments, the attachment component can be HDPE, and can have a thickness of about 0.75 inches. The thickness can vary depending on the size of the corresponding cutout and use. When a heavy object will be mounted to the mounting assembly, the attachment component can instead be metal, such as aluminum. For more fragile accessories, the attachment component 90 can be a softer material, such as a rubber pad.

Figure 15:
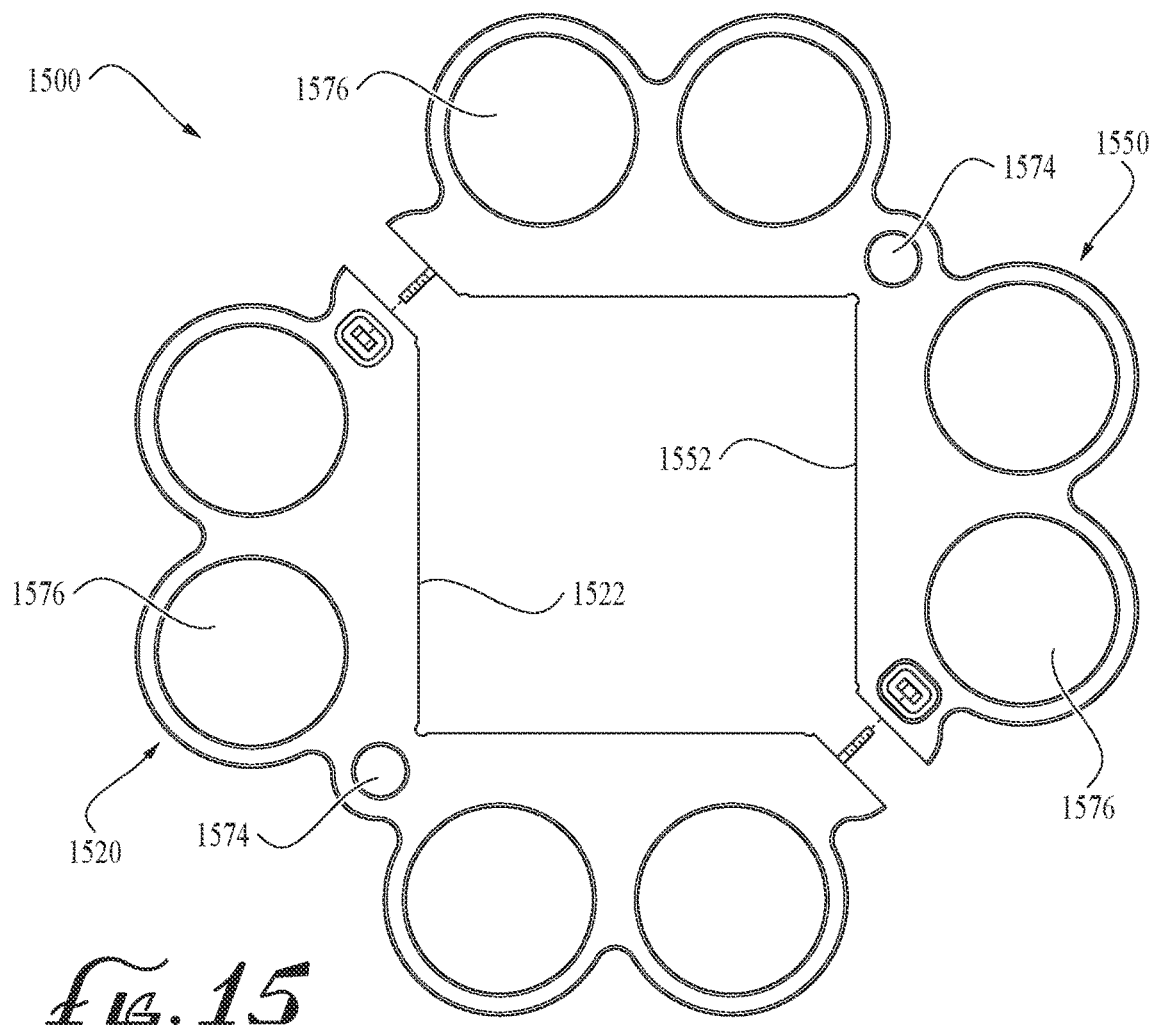
FIG. 15 shows another example embodiment in accordance with the present disclosure. The mounting assembly includes a plurality of cutouts and the internal aperture is configured to attach to a square support structure.

FIG. 15 shows another example embodiment. Mounting assembly 1500 includes four cutouts 1576 and a smaller cutout 1574 on each of brackets 1520 and 1550. The larger cutouts can be dimensioned to hold such as tennis balls, beverage cans, beverage bottles, or tools. The smaller cutouts can be used to affix hooks, carabiners, or to accommodate accessory charging cables such as a mobile phone. Clamping surfaces 1522 and 1552 are configured to receive a square support structure.

Figure 16:
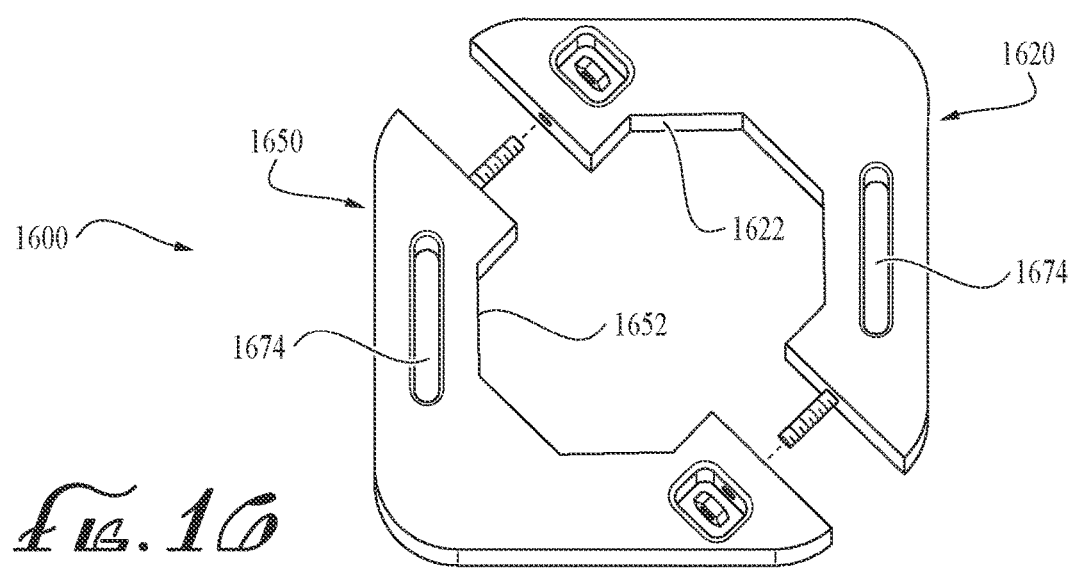
FIG. 16 shows a perspective view of a disassembled mounting assembly according to another example embodiment of the present invention in which the mounting assembly is configured to attach to an octagonal support structure.

FIG. 16 shows another example embodiment. Mounting assembly 1600 includes a slit-shaped cutout 1674 on each of brackets 1620 and 1650, which can accommodate an attachment component, a strap, hook and loop closure, or other accessory as can be envisioned by one of ordinary skill in the art. Clamping surfaces 1522 and 1552 are configured to receive an octagonal support structure.

Figure 17:
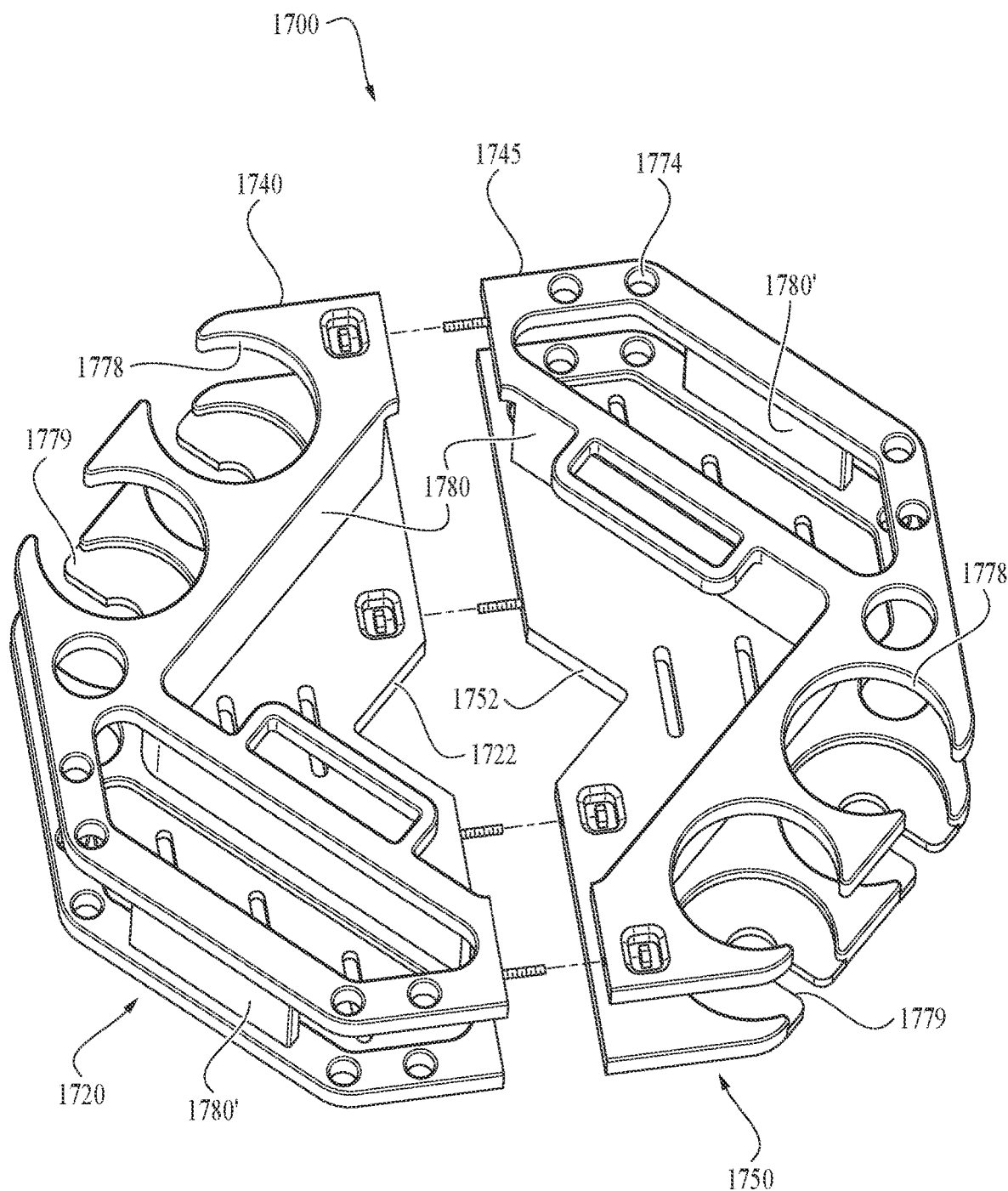
FIG. 17 is a perspective view of a disassembled mounting assembly according to another example embodiment of the present invention in which the mounting assembly has two layers, thereby forming a storage container around the support structure.
Figure 18:
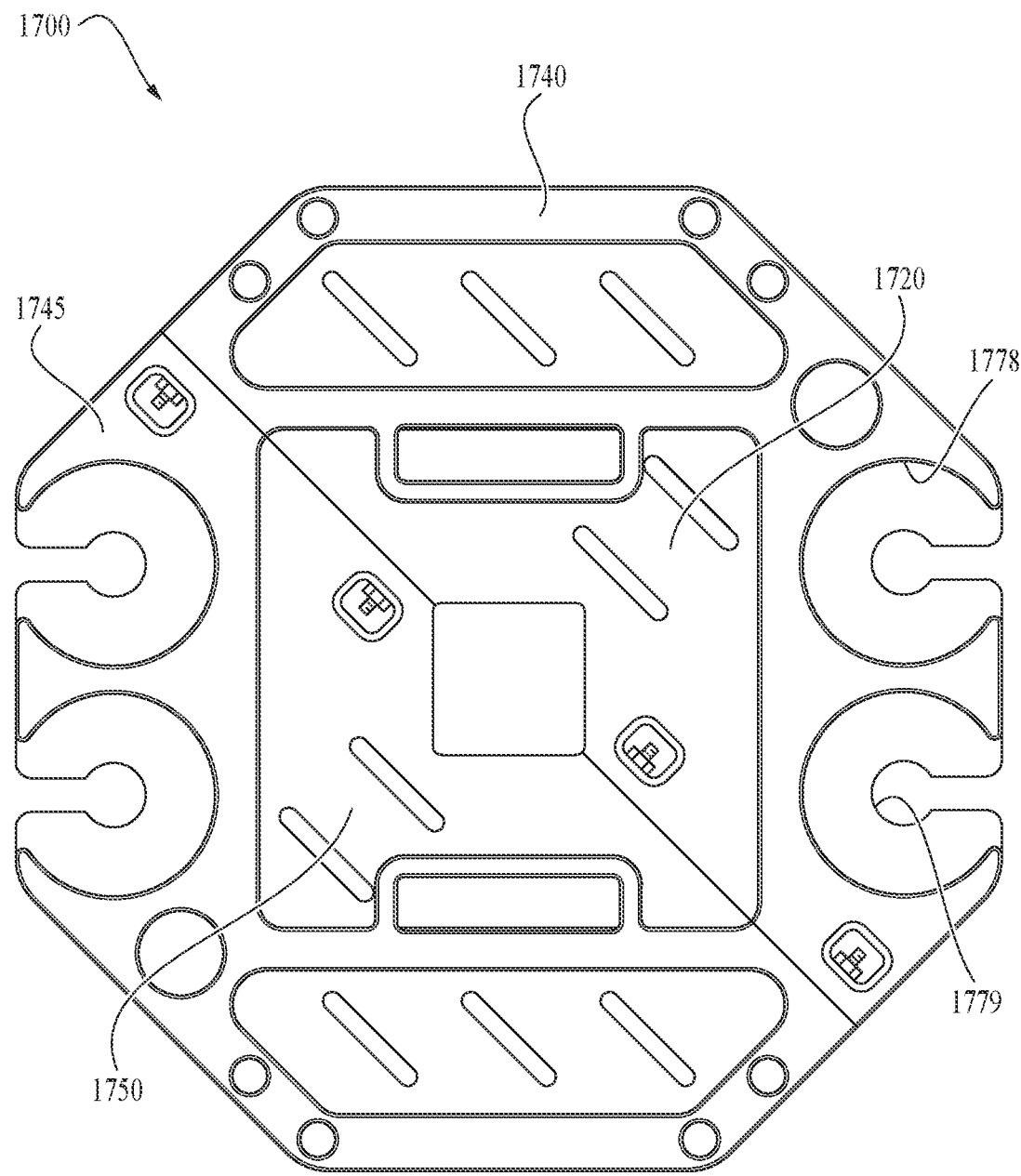
FIG. 18 is an assembled top view of the mounting assembly shown in FIG. 17.

FIGS. 17 and 18 are drawn to yet another example embodiment. Mounting assembly 1700 is a two-layer mounting assembly that forms a container around the support structure that can hold accessories such as mobile phones, keys, wallets, or other items that are preferably stored in a semi-enclosed space. Bottom brackets 1720 and 1750 frictionally engage with the support structure along clamping surfaces 1722, 1752 and provide a floor for the container. Top brackets 1740 and 1745 do not touch the support structure and are connected to uprights or walls 1780. In the depicted embodiment, four uprights connect the inner edges of the top brackets 1740, 1745 to the bottom brackets 1720 and 1750, forming the walls of the container. Two additional uprights 1780' connect the outer edges of the top brackets 1740, 1745 to bottom brackets 1720, 1750. The uprights 1780, 1780' can be fitted into pockets in brackets 1740, 1745, 1720,1750 and screwed into place or snap fitted into reliefs. Top brackets 1740, 1745 couple to each other with complementary male and female coupling elements.

Bottom brackets 1720, 1750 couple to each other with complementary male and female coupling elements.

In the depicted embodiment, both halves are duplicates. In other words, the half comprising top bracket 1730 and bottom bracket 1720 is identical to the half comprising top bracket 1735 and bottom bracket 1750. Cutouts 1778 and 1779 can be used for attaching accessories.

According to one example embodiment, one or more pairs of bracket assemblies and optional attachment component(s) connected therebetween can be provided for various other uses and functions beyond retaining and supporting heavy equipment and components. According to one example embodiment, a pair of bracket assemblies and an attachment component can be configured for supporting a table surface. For example, according to one example embodiment, a tabletop can be provided for removable attachment to at least a portion of the pair of bracket assemblies. According to example embodiments, the tabletop can comprise one or more components removably connectable with each other and/or the bracket assemblies and attachment component. According to example embodiments, the tabletop comprises two generally flat surfaces, which are removably engageable with one or more portions of the bracket assemblies and the attachment component, for example, which when connected together define a surface comprising an area of at least about 144 in$^2$.

According to example embodiments of the present invention, the bracket components as described herein may be constructed from various desired materials and methods of manufacturing. According to one example embodiment, the bracket components can comprise a plastic or polymer material, for example, high density polyethylene (HDPE). According to one example embodiment, the material is generally in sheet form and comprises a thickness of between about 0.25 inches-2 inches, for example about 0.75 inches, or about 0.5 inches or about 1.0 inches. According to some example embodiments, a cutting tool or other machine is provided to cut the brackets from the sheet material. According to other example embodiments, the bracket components may be constructed from various other materials including but not limited to metals, woods, plastics, synthetic materials, natural materials, rubbers, resins, composites and other desired materials and/or combinations thereof. According to some example embodiments, one or more of the mounting assembly components can be manufactured using Computer Numerical Control (CNC) routing or CNC milling. According to some example embodiments, one or more of the bracket components (and/or other components described herein) can be manufactured by a molding process, for example, injection or blow molding, or for example, other desired molding processes. According to some example embodiments, one or more of the bracket components can comprise a combination of two or more materials, or for example, one or more materials can be over-molded or co-molded with one or more other desired components as described herein. According to one example, at least the clamping surfaces can comprise a friction-enhancing material provided thereon (and/or co-molded or over-molded therewith).

While the invention has been described with reference to example embodiments, it will be understood by those skilled in the art that a variety of modifications, additions and deletions are within the scope of the invention, as defined by the following claims.

What is claimed is:

1. A mounting assembly for removable attachment to a support structure, the mounting assembly comprising a first bracket and a second bracket, each bracket comprising a clamping portion and a coupling portion;
   wherein the clamping portion of each bracket comprises a clamping surface configured for engagement with a segment of a perimeter of the support structure such that in a coupled position the clamping surfaces of the brackets are complimentary to an outer profile of the support structure; and
   wherein the coupling portion of the first bracket permits removable coupling engagement with the coupling portion of the second bracket so as to provide frictional engagement of the clamping surfaces with the perimeter of the support structure and so as to prevent rotational movement of the mounting assembly relative to the support structure.

2. The mounting assembly of claim 1, wherein the clamping surface comprises a groove and a gripping strip seated in the groove.

3. The mounting assembly of claim 1, wherein the first bracket and the second bracket are identical, and wherein one of the brackets is rotated 180 degrees relative to the other such that the coupling portion of the first bracket couples with the coupling portion of the second bracket.

4. The mounting assembly of claim 1, wherein at least one of the first and second brackets comprises an attachment portion, the attachment portion comprising at least one of a cutout or an opening.

5. The mounting assembly of claim 4, wherein the clamping surface of one of the bracket portions comprises a cutout, and wherein an attachment component is configured for removable coupling engagement with the cutout, and wherein an attachment component is configured to form at least a portion of the clamping surface of the bracket portion when removably connected with the cutout.

6. The mounting assembly of claim 4, further comprising an attachment component configured to couple with the attachment portion, wherein the attachment component comprises a coupling portion and a mounting portion, the coupling portion comprising a keyed cutout, the keyed cutout comprising a central neck, an upper engagement lip and a lower base engagement surface, the mounting portion comprising an attachment surface.

7. The mounting assembly of claim 4, wherein the attachment portion comprises the cutout formed with the clamping portion of one of the bracket portions, and wherein an attachment component is configured for removable coupling engagement with the cutout, the attachment component being configured to form at least a portion of the clamping portion of its respective bracket portion when removably connected with the cutout.

8. A mounting assembly for removable attachment to a support structure, the mounting assembly comprising a first bracket portion and a second bracket portion, the first bracket comprising a clamping portion and a pair of male coupling portions, and the second bracket portion comprising a clamping portion and a pair of coupling portions configured to receive the coupling portions of the first bracket,
   wherein a clamping surface of each bracket is configured for engagement with a half of a perimeter of the support structure such that in a coupled position the clamping surfaces of the bracket portions are complimentary to an outer profile of the support structure, and
   wherein the first and second brackets are configured for detachable coupling with one another so as to provide frictional engagement of the clamping surfaces with the perimeter of the support structure and so as to prevent rotational movement of the mounting assembly relative to the support structure.

9. The mounting assembly of claim 8, wherein the clamping surface comprises a groove and a gripping strip seated in the groove.

10. The mounting assembly of claim 8, wherein at least one of the first and second brackets comprises an attachment portion, the attachment portion comprising at least one of a cutout or an opening.

11. The mounting assembly of claim 10, wherein the clamping surface of one of the bracket portions comprises a cutout, and wherein an attachment component is configured for removable coupling engagement with the cutout, and wherein an attachment component is configured to form at least a portion of the clamping surface of the bracket portion when removably connected with the cutout.

12. The mounting assembly of claim 11, wherein the attachment component comprises a coupling portion and a mounting portion, the coupling portion comprising a keyed cutout, the keyed cutout comprising a central neck, an upper engagement lip and a lower base engagement surface, the mounting portion comprising an attachment surface.

13. The mounting assembly of claim 12, wherein the attachment surface of the mounting portion is configured for the attachment thereto of one of an accessory mount, an item, or an accessory.

14. The mounting assembly of claim 8, wherein the first and second bracket portions are formed from a sheet material comprising a thickness of at least 0.25 inches.

15. The mounting assembly of claim 14, wherein the sheet material comprises high density polyethylene.

16. A mounting assembly for removable attachment to a support structure, the mounting assembly comprising a first bracket and a second bracket, each bracket comprising a clamping surface and a pair of engagement faces,
wherein the clamping surface of each bracket is configured for engagement with a portion of a perimeter of the support structure such that in a coupled position the clamping surfaces of the brackets are complimentary to an outer profile of the support structure,
wherein when the mounting assembly is in a coupled position, the engagement faces of the first bracket portion are in contact with the engagement faces of the second bracket portion, wherein the engagement faces are coupled by a male end and a female end, the male end comprising a threaded fastener and the female end comprising a receiver for receiving the threaded fastener and a passageway for securing a threaded nut to the threaded fastener,
wherein the clamping surfaces frictionally engage with the perimeter of the support structure and prevent rotational movement of the mounting assembly relative to the support structure.

17. The mounting assembly of claim 16, wherein when the first bracket comprises two male ends, the second bracket comprises two female ends, and
wherein when the first bracket portion comprises a male and a female end, the second bracket portion comprises a female end and a male end configured to removably couple with the first bracket portion.

18. The mounting assembly of claim 16, wherein the clamping surface comprises a groove and a gripping strip seated in the groove.

19. The mounting assembly of claim 16, wherein at least one of the brackets comprises a mounting portion comprising a cutout or opening extending between upper and lower surfaces thereof, the cutout or opening permitting removable attachment of an attachment component, an accessory mount, or an item.

20. The mounting assembly of claim 19, wherein the attachment component comprises a coupling portion and a mounting portion, the coupling portion comprising a keyed cutout, the keyed cutout comprising a central neck, an upper engagement lip and a lower base engagement surface, the mounting portion comprising an attachment surface.

* * * * *